(12) United States Patent
Tanabe

(10) Patent No.: US 12,443,147 B2
(45) Date of Patent: Oct. 14, 2025

(54) ELECTRONIC WATCH AND ELECTRONIC WATCH CONTROL METHOD

(71) Applicant: SEIKO EPSON CORPORATION, Tokyo (JP)

(72) Inventor: Takuya Tanabe, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 354 days.

(21) Appl. No.: 18/155,981

(22) Filed: Jan. 18, 2023

(65) Prior Publication Data

US 2023/0229114 A1 Jul. 20, 2023

(30) Foreign Application Priority Data

Jan. 19, 2022 (JP) ................. 2022-006173

(51) Int. Cl.
G04C 3/14 (2006.01)
H02P 8/12 (2006.01)
H02P 8/34 (2006.01)

(52) U.S. Cl.
CPC .................. *G04C 3/14* (2013.01); *H02P 8/12* (2013.01); *H02P 8/34* (2013.01)

(58) Field of Classification Search
CPC .......... G04C 3/14; G04C 3/143; G04C 3/146; G04C 103/02; H02P 8/12; H02P 8/34
USPC .......................................................... 368/81
See application file for complete search history.

(56) References Cited

U.S. PATENT DOCUMENTS

| 5,280,459 A | 1/1994 | Nakamura | |
|---|---|---|---|
| 2019/0286064 A1* | 9/2019 | Yamamoto | ............... G04C 3/14 |
| 2019/0302698 A1 | 10/2019 | Kawaguchi | |
| 2019/0302699 A1* | 10/2019 | Kimura | .................. G04G 19/12 |
| 2019/0305702 A1* | 10/2019 | Kawaguchi | .............. G04C 3/14 |
| 2020/0225618 A1* | 7/2020 | Okumura | .................. H02P 8/32 |
| 2021/0149344 A1* | 5/2021 | Saito | ......................... H02P 8/02 |
| 2021/0223742 A1 | 7/2021 | Akiyama | |

FOREIGN PATENT DOCUMENTS

| CN | 110320790 A | 10/2019 |
|---|---|---|
| JP | H05-256958 A | 10/1993 |
| JP | 2021-083231 A | 5/2021 |
| JP | 2021-113782 A | 8/2021 |

* cited by examiner

*Primary Examiner* — Edwin A. Leon
*Assistant Examiner* — Kevin Andrew Johnston
(74) *Attorney, Agent, or Firm* — Harness, Dickey & Pierce, P.L.C.

(57) ABSTRACT

An electronic watch includes hands, a stepping motor, a drive circuit, a controller, a current detection circuit that detects a current value flowing through the drive circuit, and a storage unit that stores polarity information of a drive pulse output from the controller to the drive circuit, wherein the controller initializes the polarity information stored in the storage unit when the storage unit is initialized, outputs a polarity detection pulse, which does not cause the stepping motor to rotate by one step, to the drive circuit based on the initialized polarity information, performs a polarity determination processing of determining whether a polarity of the stepping motor and the polarity information match based on the current value detected by the current detection circuit in response to the output of the polarity detection pulse, and changes the polarity information when the polarity of the stepping motor and the polarity information do not match.

16 Claims, 15 Drawing Sheets

ELECTRONIC WATCH AND ELECTRONIC WATCH CONTROL METHOD

BACKGROUND

The present application is based on, and claims priority from JP Application Serial Number 2022-006173, filed Jan. 19, 2022, the disclosure of which is hereby incorporated by reference herein in its entirety.

1. TECHNICAL FIELD

The present disclosure relates to an electronic watch and an electronic watch control method.

2. RELATED ART

JP-A-2021-113782 discloses an electronic watch that shortens a processing time for hand position detection after a system reset by performing a hand position detection operation for detecting whether a hand is positioned at a reference position while moving the hand in a forward direction after moving it in a reverse direction when a system reset is performed such as when the hand is attached or when a battery is inserted. This electronic watch outputs two forward drive pulses before moving the hand in the reverse direction to perform a hand movement for polarity matching of the rotor. Outputting two forward drive pulses drives the hand by one step if the polarity of the rotor does not match that of the drive pulses and drives the hand by two steps if the polarity of the rotor matches that of the drive pulses, such that the polarities of the rotor and drive pulses can be matched.

The electronic watch disclosed in JP-A-2021-113782 outputs two forward drive pulses for polarity matching of the rotor upon a system reset. Therefore, if the hand is at the reference position, the position of the hand will shift due to the polarity matching and thus a process of moving the hand in the reverse direction by a given number of steps and then moving it in the forward direction and detecting whether it is at the reference position is required, which takes time. Thus, it has been desired to eliminate drive pulses output for polarity matching, that is, to be able to determine the polarity of the rotor without moving the hand.

SUMMARY

An electronic watch of the present disclosure includes a hand, a stepping motor including a coil, the stepping motor being configured to drive the hand, a drive circuit configured to drive the stepping motor, a controller configured to control the drive circuit, a current detection circuit configured to detect a current value flowing through the drive circuit, and a storage unit configured to store polarity information of a drive pulse output from the controller to the drive circuit, wherein the controller is configured to: initialize the polarity information stored in the storage unit when the storage unit is initialized, output a polarity detection pulse to the drive circuit based on the initialized polarity information, the polarity detection pulse not causing the stepping motor to rotate by one step, perform a polarity determination processing of determining whether a polarity of the stepping motor and the polarity information match based on the current value detected by the current detection circuit in response to the output of the polarity detection pulse, and change the polarity information when the polarity of the stepping motor and the polarity information do not match.

An electronic watch of the present disclosure includes a hand, a stepping motor including a coil, the stepping motor being configured to drive the hand, a drive circuit configured to drive the stepping motor, a controller configured to control the drive circuit, a current detection circuit configured to detect a current value flowing through the drive circuit, and a storage unit configured to store polarity information of a drive pulse output from the controller to the drive circuit, wherein the controller is configured to: output a polarity detection pulse to the drive circuit based on the polarity information stored in the storage unit, the polarity detection pulse not causing the stepping motor to rotate by one step, the current detection circuit is configured to detect the current value during output of the polarity detection pulse, and the controller is configured to measure an elapsed time from start of output of the polarity detection pulse, determine that a polarity of the stepping motor and the polarity information match when the elapsed time until it is detected that the current value exceeds a predetermined value is within a predetermined time, determine that the polarity of the stepping motor and the polarity information do not match when the elapsed time exceeds the predetermined time, and change the polarity information when the polarity of the stepping motor and the polarity information do not match.

An electronic watch control method of the present disclosure is a method for controlling an electronic watch including a hand, a stepping motor including a coil, the stepping motor being configured to drive the hand, a drive circuit configured to drive the stepping motor, a current detection circuit configured to detect a current value flowing through the drive circuit, and a storage unit configured to store polarity information of a drive pulse output to the drive circuit, the method including initializing the polarity information stored in the storage unit when the storage unit is initialized, outputting a polarity detection pulse to the drive circuit based on the initialized polarity information, the polarity detection pulse not causing the stepping motor to rotate by one step, performing a polarity determination processing of determining whether a polarity of the stepping motor and the polarity information match based on the current value detected by the current detection circuit in response to the output of the polarity detection pulse, and changing the polarity information when the polarity of the stepping motor and the polarity information do not match.

An electronic watch control method of the present disclosure is a method for controlling an electronic watch including a hand, a stepping motor including a coil, the stepping motor being configured to drive the hand, a drive circuit configured to drive the stepping motor, a current detection circuit configured to detect a current value flowing through the drive circuit, and a storage unit configured to store polarity information of a drive pulse output to the drive circuit, the method including outputting a polarity detection pulse to the drive circuit based on the polarity information stored in the storage unit, the polarity detection pulse not causing the stepping motor to rotate by one step, detecting the current value during output of the polarity detection pulse by the current detection circuit, measuring an elapsed time from start of output of the polarity detection pulse, determining that a polarity of the stepping motor and the polarity information match when the elapsed time until it is detected that the current value exceeds a predetermined value is within a predetermined time, determining that the polarity of the stepping motor and the polarity information do not match when the elapsed time exceeds the predetermined time, and changing the polarity information when the polarity of the stepping motor and the polarity information do not match.

DESCRIPTION OF EXEMPLARY EMBODIMENTS

First Embodiment

Figure 1:
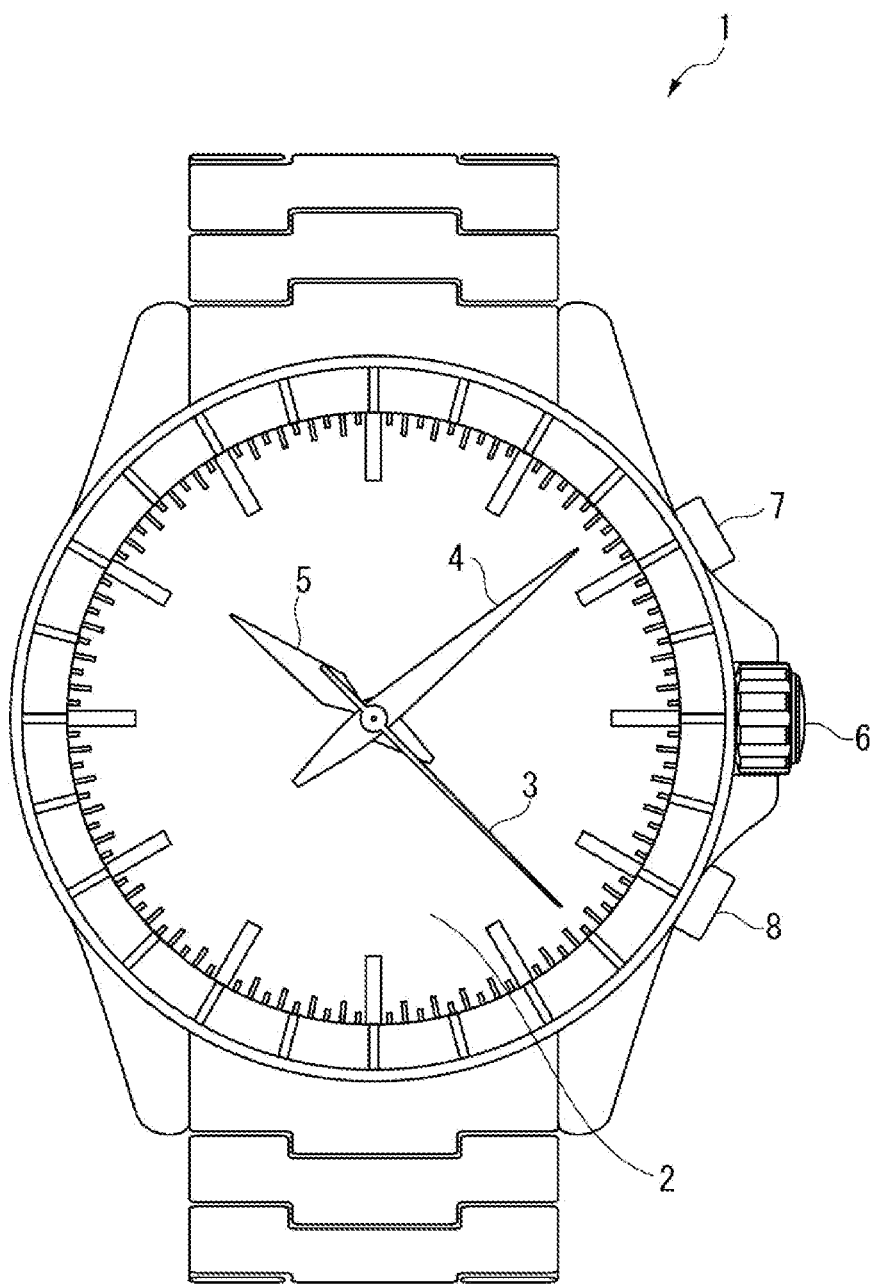
FIG. 1 is a front view showing an electronic watch of a first embodiment.

An electronic watch 1 of a first embodiment will be described below with reference to the drawings. FIG. 1 is a front view showing the electronic watch 1. The electronic watch 1 is a chronograph watch having a stopwatch function and the like.

As shown in FIG. 1, the electronic watch 1 includes a disc-shaped dial plate 2, a second hand 3, a minute hand 4, an hour hand 5, a crown 6, an A-button 7, and a B-button 8. Circuit Configuration of Electronic Watch FIG. 2 is a diagram showing the circuit configuration of the electronic watch 1.

Figure 2:
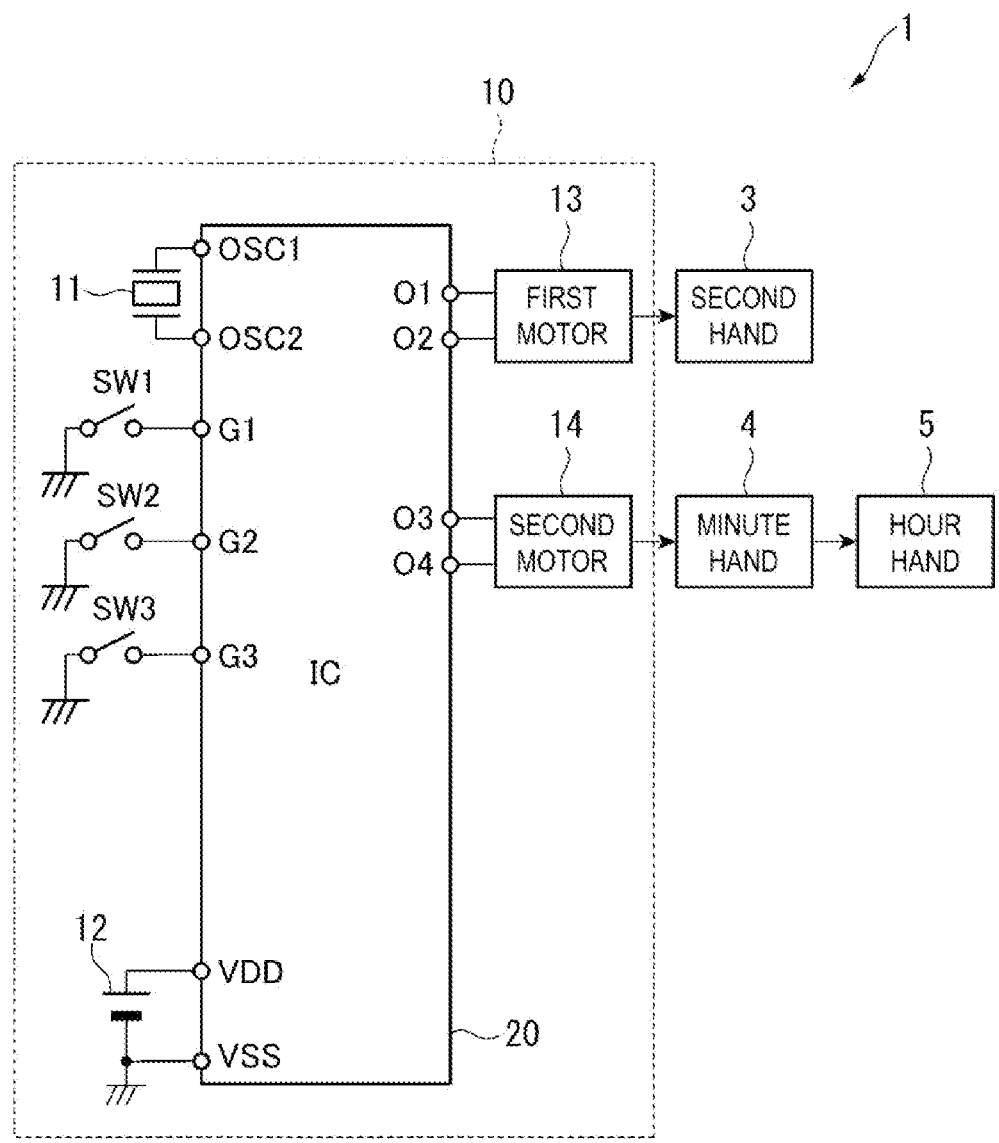
FIG. 2 is a circuit diagram showing a circuit configuration of the electronic watch of the first embodiment.

As shown in FIG. 2, the electronic watch 1 includes a movement 10 that drives the second, minute, and hour hands 3, 4, and 5 which are hands of the electronic watch 1.

The movement 10 includes a crystal oscillator 11 which is a signal source, a battery 12 which is a power source, switches SW1 to SW3, a first motor 13, a second motor 14, and an IC 20 for watches.

The switch SW1 is turned on and off in conjunction with an operation of pulling out the crown 6 shown in FIG. 1. The switch SW2 is turned on and off in conjunction with the operation of the A-button 7. The switch SW3 is turned on and off in conjunction with the operation of the B-button 8.

The first motor 13 is a stepping motor that drives the second hand 3 and the second motor 14 is a stepping motor that drives the minute and hour hands 4 and 5. "IC" is an abbreviation for integrated circuit.

The IC 20 includes connection terminals OSC1 and OSC2 to which the crystal oscillator 11 is connected, input/output terminals G1 to G3 to which the switches SW1 to SW3 are connected, power supply terminals VDD and VSS to which the battery 12 is connected, output terminals O1 and O2 connected to the first motor 13, and output terminals O3 and O4 connected to the second motor 14.

In the first embodiment, a positive electrode of the battery 12 is connected to the power supply terminal VDD on a high potential side, a negative electrode thereof is connected to the power supply terminal VSS on a low potential side, and the power supply terminal VSS on the low potential side is set to a reference potential.

The battery 12 is made of a primary battery or a secondary battery. When the battery 12 is a secondary battery, it is charged by a power generator such as a solar cell (not shown).

Figure 3:
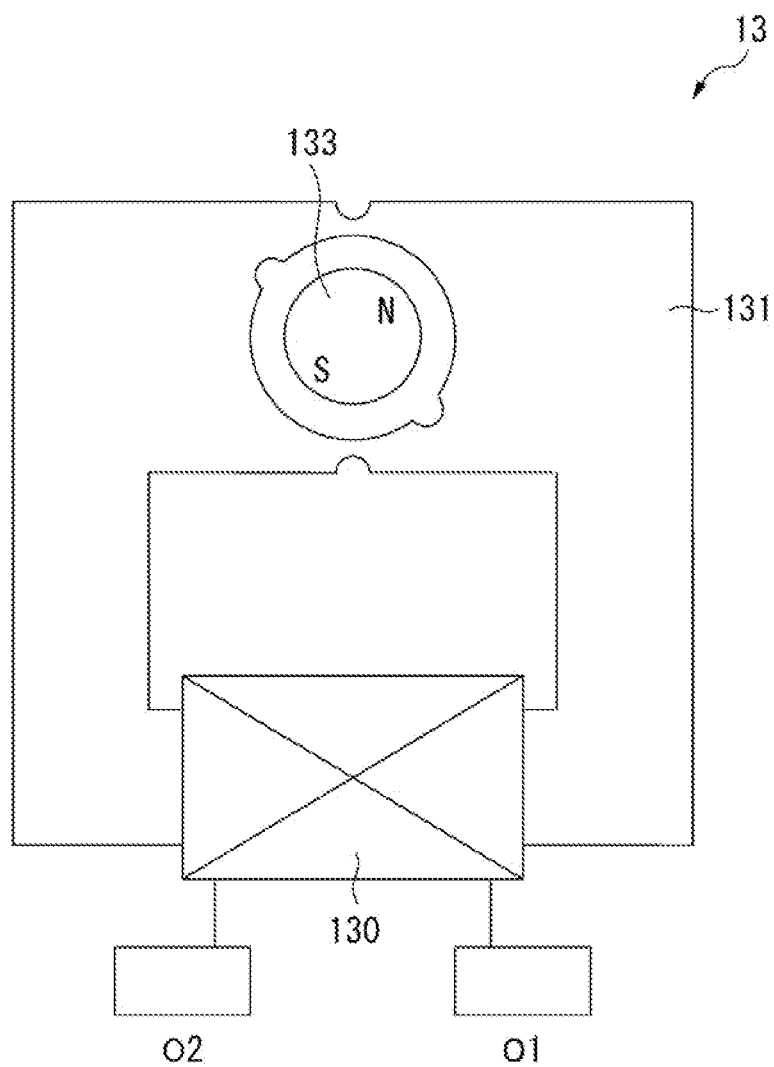
FIG. 3 is a diagram showing a configuration of a first motor of the electronic watch of the first embodiment.

FIG. 3 is a diagram showing a configuration of the first motor 13. The second motor 14 has the same configuration as the first motor 13 and description thereof will be omitted.

As shown in FIG. 3, the first motor 13 includes a stator 131, a coil 130, and a rotor 133. Both ends of the coil 130 are electrically connected to the output terminals O1 and O2 of the IC 20. The rotor 133 is a magnet with two radially magnetized poles. Thus, the first motor 13 is a two-pole single-phase stepping motor used for electronic watches and is driven by a drive current supplied thereto from the output terminals O1 and O2 of the IC 20.

For example, it is assumed that a magnetic field which is counterclockwise in FIG. 3 is generated when a drive current flows through the coil 130 from the output terminal O1 to the output terminal O2. This magnetic field polarizes the stator 131 to repel the rotor 133, causing the rotor 133 to rotate a unit amount of 180 degrees. When the rotor 133 has completely rotated 180 degrees, the drive current in turn flows from the output terminal O2 to the output terminal O1. Then, a magnetic field which is clockwise in FIG. 3 is generated. This magnetic field polarizes the stator 131 in the opposite direction to repel the rotor 133, causing the rotor 133 to further rotate 180 degrees. The rotor 133 repeats this operation to continue to rotate. Switching the direction of the drive current by switching the output terminal O1 or O2 from which a drive current is supplied each time the rotor 133 rotates a unit amount as described above corresponds to switching the polarity of the drive current. The IC 20 of the first embodiment alternately and repeatedly switches between two polarities, a first polarity in which a drive current flows from the output terminal O1 to the output terminal O2 and a second polarity in which a drive current flows from the output terminal O2 to the output terminal O1, to cause the rotor 133 to rotate a desired amount of rotation. In the present specification, the angle of the orientation of the rotor 133 that can be represented by an angle of 0 to 360 degrees is referred to as a "rotation angle" and an accumulated rotation angle when a unit amount of rotation is repeated a plurality of times is referred to as an "amount of rotation".

Similarly, the second motor 14 is driven by a drive current supplied from the output terminals O3 and O4 of the IC 20.

Circuit Configuration of IC

Figure 4:
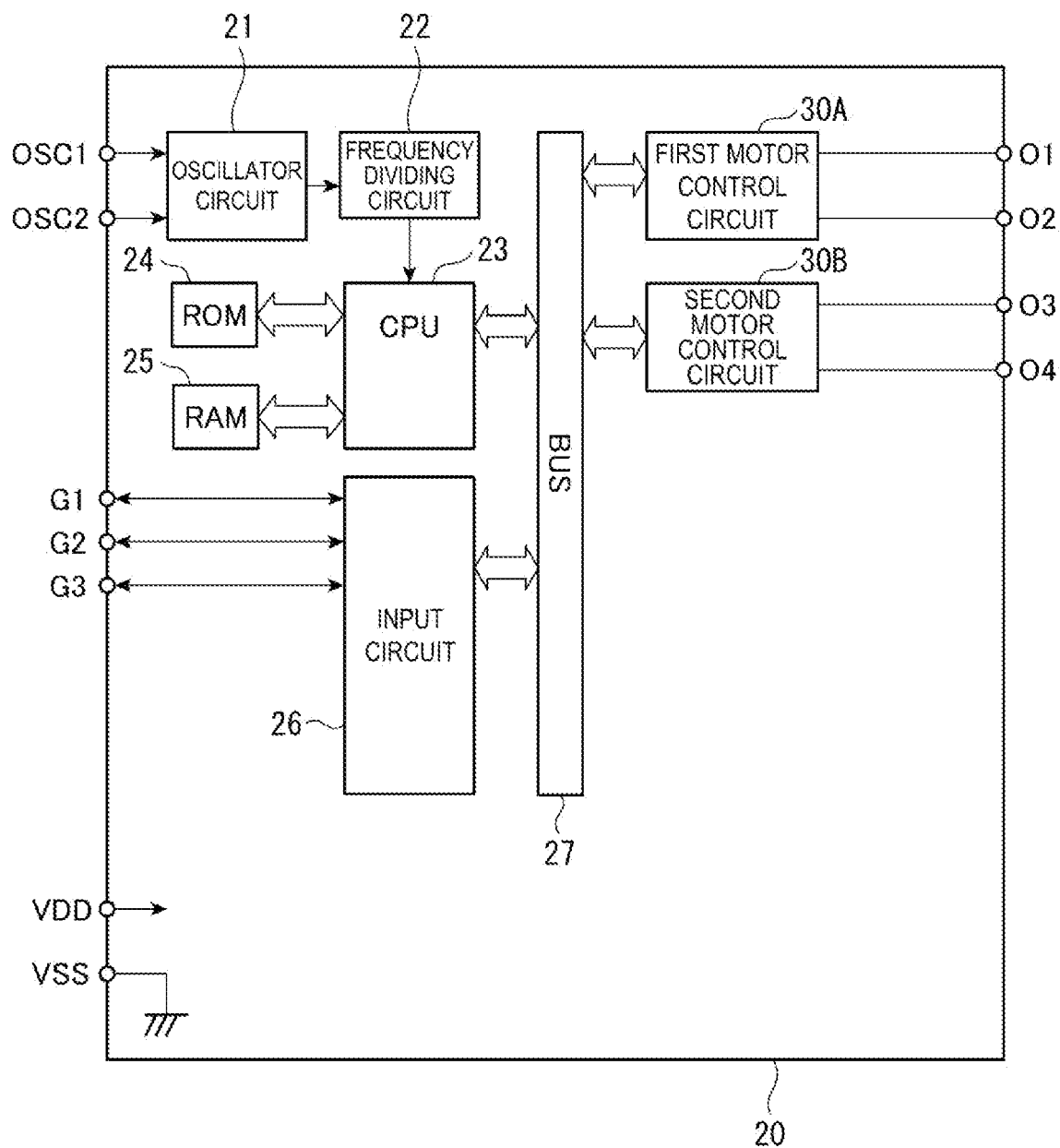
FIG. 4 is a configuration diagram showing an IC configuration of the electronic watch of the first embodiment.

FIG. 4 is a configuration diagram showing a configuration of the IC 20.

As shown in FIG. 4, the IC 20 includes an oscillator circuit 21, a frequency dividing circuit 22, a CPU 23 which is a controller of the electronic watch 1, a ROM 24, a RAM 25, an input circuit 26, a BUS 27, a first motor control circuit 30A, and a second motor control circuit 30B. The first and second motor control circuits 30A and 30B are examples of a motor control circuit. "CPU" is an abbreviation for central processing unit and "ROM" is an abbreviation for read only memory. "RAM" is an abbreviation for random access memory.

The oscillator circuit 21 causes the crystal oscillator 11, which is a reference signal source shown in FIG. 2, to oscillate at a high frequency and outputs an oscillation signal of a predetermined frequency (32768 Hz) generated by this high frequency oscillation to the frequency dividing circuit 22.

The frequency dividing circuit 22 frequency-divides the output of the oscillator circuit 21 and supplies a timing signal or a reference signal of 1 Hz to the CPU 23.

The ROM 24 stores various programs to be executed by the CPU 23. In the first embodiment, the ROM 24 stores a program for implementing a polarity detection function of detecting the polarities of the stepping motors after a reset in addition to programs for implementing a time measuring function, a stopwatch function, and the like.

The CPU 23 executes the programs stored in the ROM 24 to implement the functions described above. That is, the CPU 23 implements a time measuring function of counting cycles of the reference signal supplied from the frequency dividing circuit 22 to measure the current time, an elapsed time when a stopwatch operation is performed, or the like, a drive control function of controlling driving of the stepping motors for moving the hands according to the measured time or the like, and a polarity detection function of detecting the polarities of the stepping motors.

The input circuit 26 outputs the states of the input/output terminals G1 to G3 to the BUS 27. The BUS 27 is used for data transfer between the CPU 23, the input circuit 26, the first motor control circuit 30A, and the second motor control circuit 30B.

The first and second motor control circuits 30A and 30B supply predetermined drive currents to the coils 130 of the first and second motors 13 and 14 by drive pulses input from the CPU 23 through the BUS 27. Here, the CPU 23 outputs drive pulses according to polarity information stored in the RAM 25 to the first and second motor control circuits 30A and 30B. Thus, the RAM 25 is a storage unit that stores the polarity information, that is, the first polarity or the second polarity, of drive pulses to be output to the first and second motor control circuits 30A and 30B. The polarity information stored in the RAM 25 is alternately changed between the first polarity and the second polarity each time the CPU 23 outputs a drive pulse.

When the RAM 25 is initialized due to a system reset or the like, the CPU 23 also initializes the polarity information stored in the RAM 25. In the first embodiment, when the RAM 25 is initialized, the CPU 23 stores the first polarity in the RAM 25 as an initial value of the polarity information.

Configuration of Motor Control Circuit

The first motor control circuit 30A controls the first motor 13 such that the second hand 3 can move in forward and reverse directions, that is, in both clockwise and counter-clockwise directions. Thus, the first motor control circuit 30A may be any circuit that can drive and control the first motor 13 in the forward and reverse directions.

Similarly, the second motor control circuit 30B controls the second motor 14 such that the minute and hour hands 4 and 5 can move in both forward and reverse directions.

Figure 5:
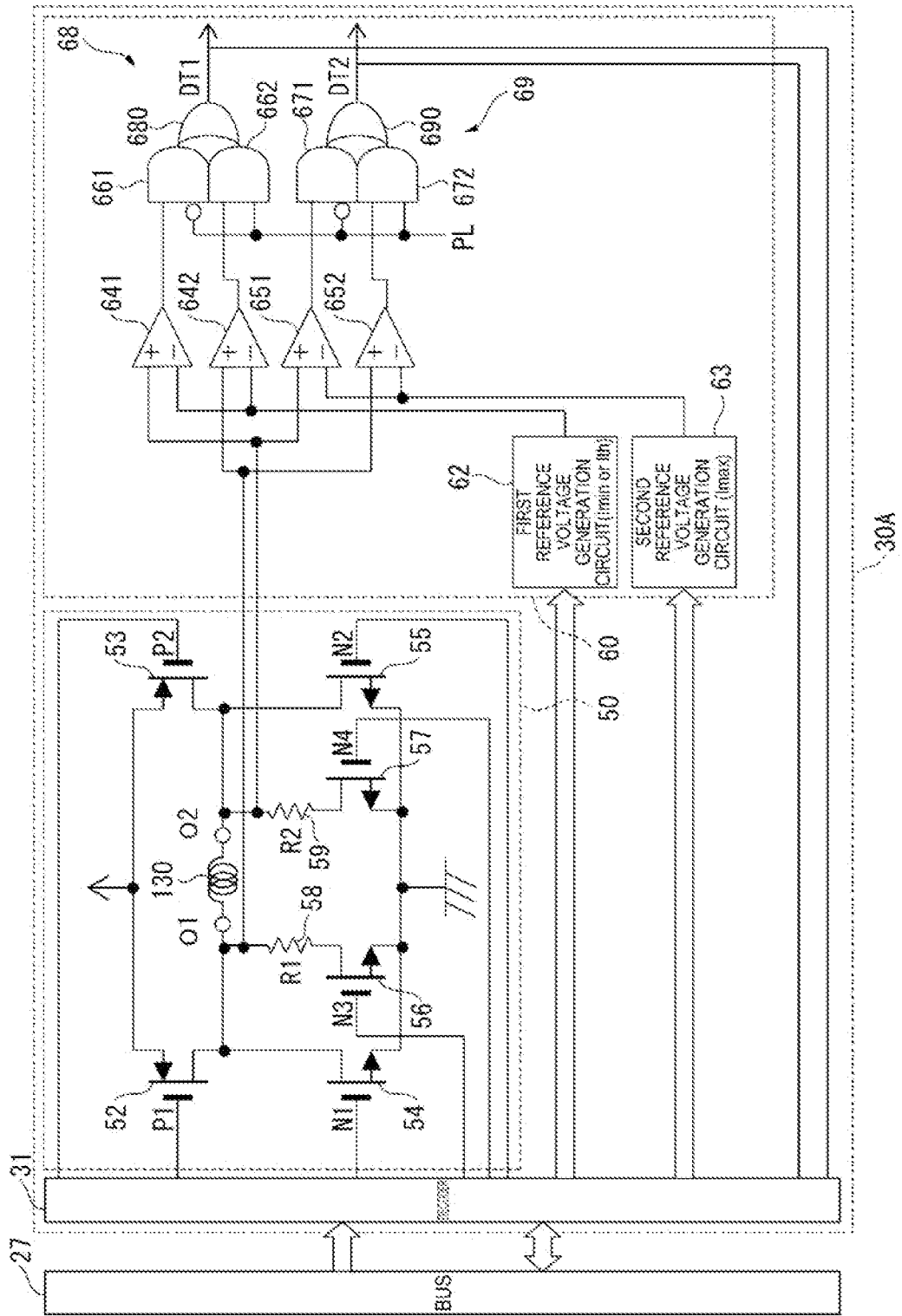
FIG. 5 is a circuit diagram showing a configuration of a first motor control circuit of the first embodiment.

FIG. 5 is a circuit diagram showing a configuration of the first motor control circuit 30A. The configuration of the second motor control circuit 30B is similar to that of the first motor control circuit 30A and thus the description thereof will be omitted.

The first motor control circuit 30A includes a decoder 31, a driver 50, and a current detection circuit 60.

The decoder 31 outputs control signals to the driver 50 based on drive pulses output from the CPU 23. That is, a drive pulse of the first polarity or the second polarity output from the CPU 23 is input to the decoder 31 via the BUS 27. The decoder 31 outputs gate signals P1, P2, N1, N2, N3, and N4 to the driver 50 as control signals according to the polarity of the input drive pulse. That is, the decoder 31 outputs, when a drive pulse of the first polarity has been input, control signals set to cause a drive current to flow through the coil 130 from the output terminal O1 to the output terminal O2 and outputs, when a drive pulse of the second polarity has been input, control signals set to cause a drive current to flow through the coil 130 from the output terminal O2 to the output terminal O1. Thus, the CPU 23, the BUS 27, and the decoder 31 are a driver controller that controls the driver 50.

The driver 50 is a drive circuit that supplies a current to the coil 130 of the first motor 13 to drive the stepping motor. The driver 50 includes two Pch transistors 52 and 53, four Nch transistors 54, 55, 56, and 57, and two detection resistors 58 and 59. The transistors 52 to 57 are controlled by control signals output from the decoder 31 to supply the coil 130 of the first motor 13 with a current I in both forward and reverse directions.

The current detection circuit 60 includes a first reference voltage generation circuit 62, a second reference voltage generation circuit 63, comparators 641, 642, 651, and 652, and composite gates 68 and 69. The composite gate 68 is a single element with functionality equivalent to that of a combination of AND circuits 661 and 662 and an OR circuit 680. The composite gate 69 is a single element with functionality equivalent to that of a combination of AND circuits 671 and 672 and an OR circuit 690.

The comparators 641 and 642 compare a voltage generated across the coil 130 with the voltage of the first reference voltage generation circuit 62.

Because a drive polarity signal PL output from the decoder 31 is inverted and input to the AND circuit 661 and the drive polarity signal PL is input to the AND circuit 662 as it is, an output of one of the comparators 641 and 642 selected by the drive polarity signal PL is output as a detection signal DT1.

The comparators 651 and 652 compare a voltage generated across the coil 130 with the voltage of the second reference voltage generation circuit 63.

Because the drive polarity signal PL is inverted and input to the AND circuit 671 and the drive polarity signal PL is input to the AND circuit 672 as it is, an output of one of the comparators 651 and 652 selected by the drive polarity signal PL is output as a detection signal DT2.

The first reference voltage generation circuit 62 selects and generates a voltage corresponding to a lower limit target current value Imin or a voltage corresponding to a polarity determination current value Ith. The polarity determination current value Ith is a current value lower than the lower limit target current value Imin.

At the time of polarity determination, a selection signal for selecting the polarity determination current value Ith is input from the CPU 23 to the first reference voltage generation circuit 62 via the BUS 27 and the first reference voltage generation circuit 62 outputs a potential corresponding to a voltage generated across the coil 130 when the current I flowing through the coil 130 is the polarity determination current value Ith.

As will be described later, when the motor is fast-driven, a selection signal for selecting the lower limit target current value Imin is input from the CPU 23 to the first reference voltage generation circuit 62 via the BUS 27 and the first reference voltage generation circuit 62 outputs a potential corresponding to a voltage generated across the coil 130 when the current I flowing through the coil 130 is the lower limit target current value Imin.

Thus, at the time of motor driving, when the current I flowing through the coil 130 is equal to or higher than the lower limit target current value Imin, the voltage generated across the coil 130 is equal to or higher than the output voltage of the first reference voltage generation circuit 62 and therefore the detection signal DT1 is at a high level H. On the other hand, when the current I is lower than the lower limit target current value Imin, the detection signal DT1 is at a low level L. Thus, the first reference voltage generation circuit 62, the comparators 641 and 642, and the composite gate 68 of the current detection circuit 60 are configured to detect that the current I flowing through the coil 130 has changed from a value higher than the lower limit target current value Imin to a value lower than the lower limit target current value Imin.

Similarly, at the time of polarity determination, when the current I flowing through the coil 130 is equal to or higher than the polarity determination current value Ith, the voltage generated across the coil 130 is equal to or higher than the output voltage of the first reference voltage generation circuit 62 and therefore the detection signal DT1 is at a high level H. On the other hand, when the current I is lower than the polarity determination current value Ith, the detection signal DT1 is at a low level L. Thus, the first reference voltage generation circuit 62, the comparators 641 and 642, and the composite gate 68 of the current detection circuit 60 are configured to detect that the current I flowing through the coil 130 has changed from a value lower than the polarity determination current value Ith to a value higher than the polarity determination current value Ith as the first reference voltage generation circuit 62 selects the polarity determination current value Ith.

The second reference voltage generation circuit 63 generates a voltage corresponding to an upper limit target current value Imax. Thus, the detection signal DT2 of the current detection circuit 60 is at a high level H when the current I flowing through the coil 130 exceeds the upper limit target current value Imax and is at a low level L when the current I is equal to or less than the upper limit target current value Imax. Therefore, the second reference voltage generation circuit 63, the comparators 651 and 652, and the composite gate 69 of the current detection circuit 60 are configured to detect that the current I flowing through the coil 130 has changed from a value lower than the upper limit target current value Imax to a value higher than the upper limit target current value Imax.

Polarity Detection Process

Figure 6:
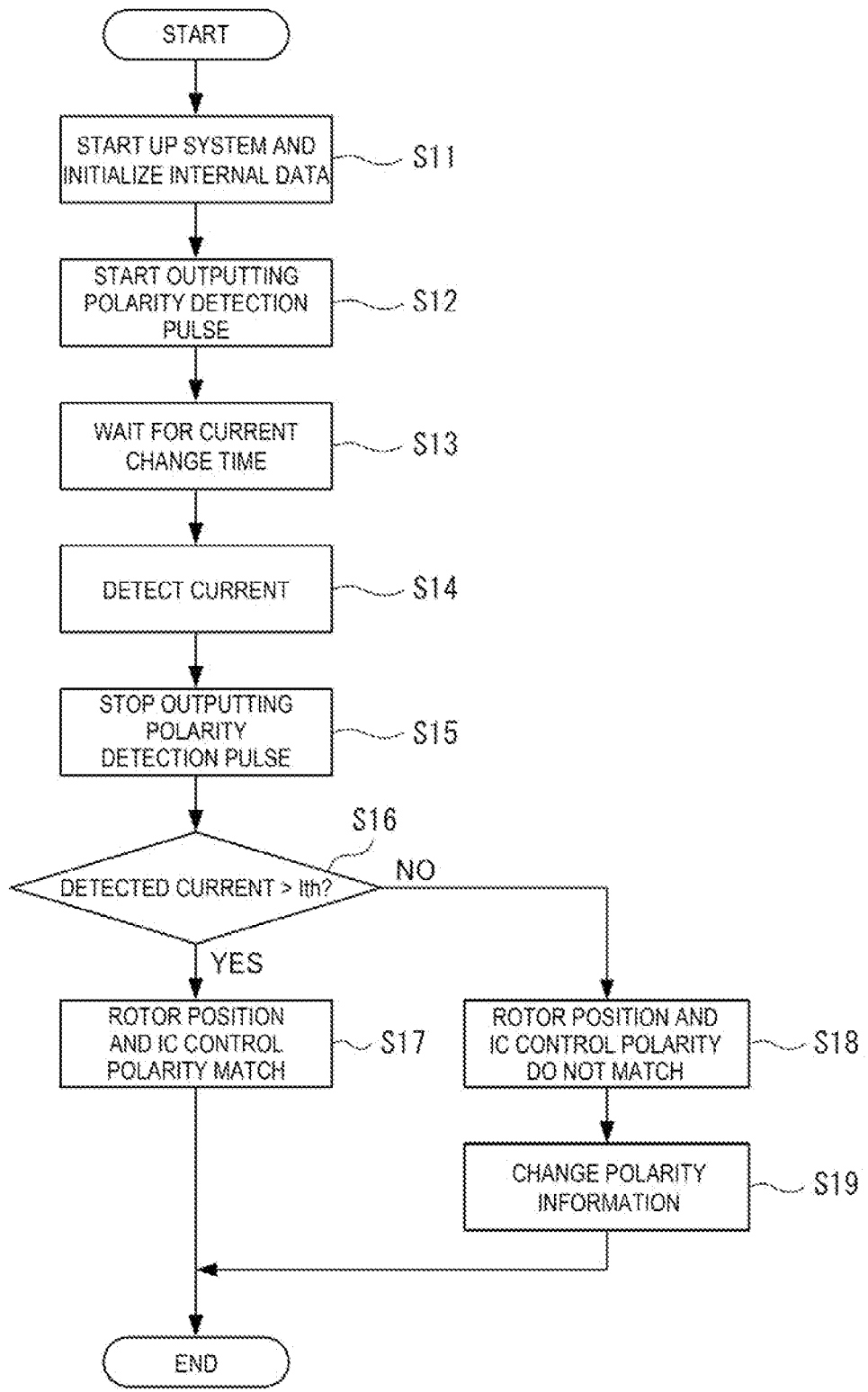
FIG. 6 is a flowchart for explaining a polarity detection process of the first embodiment.

Next, a polarity detection process performed upon a system reset of the electronic watch 1 will be described with reference to FIG. 6. A system reset is performed when a predetermined condition is satisfied such as when an operator operates the crown 6, the A-button 7, or the B-button 8, performs an input operation on a system reset terminal exposed by opening a back cover, or inserts a battery.

When the system is reset, the CPU 23 executes step S11 to start up the system and initialize internal data such as polarity information stored in the RAM 25. Thus, the information stored in the RAM 25 is the first polarity which is an initial value.

Next, the CPU 23 executes step S12 to start outputting a polarity detection pulse of the initialized first polarity. The polarity detection pulse is a pulse that does not cause the rotor 133 to rotate by one step, for example, a pulse output that causes the rotor 133 to rotate an angle of 45 degrees or less. That is, the polarity detection pulse is set to a pulse width that does not cause the rotor 133 to rotate by one step by setting the pulse width, that is, the voltage application time, according to the relationship between the resistance value of the coil 130 and the electromotive force. For example, in the case of a stepping motor whose coil 130 has a resistance value of 2 kΩ, the current polarity of the stepping motor can be determined by setting the pulse width of the polarity detection pulse to 300 μsec and the polarity determination current value Ith to 0.16 mA. Further, in the case of a stepping motor whose coil 130 has a resistance value of 500Ω, the polarity can be determined by setting the pulse width of the polarity detection pulse to 100 μsec and setting the polarity determination current value Ith to 1.6 mA.

Next, the CPU 23 executes step S13 to wait for a preset current change time. The current change time is set according to the pulse width of the polarity detection pulse, that is, the polarity detection time. That is, the current change time is slightly shorter than the polarity detection time. For example, the current change time is set to about 280 μsec when the polarity detection time is 300 μsec and set to about 90 μsec when the polarity detection time is 100 μsec.

When the current change time has elapsed from the start of output of the polarity detection pulse, the CPU 23 executes step S14 to detect a current flowing through the driver 50 which is the drive circuit, that is, the current I flowing through the coil 130. Specifically, the CPU 23 selects a voltage corresponding to the polarity determination current value Ith as the voltage generated by the first reference voltage generation circuit 62 and detects whether the value of the current I flowing through the coil 130 exceeds the polarity determination current value Ith.

Figure 7:
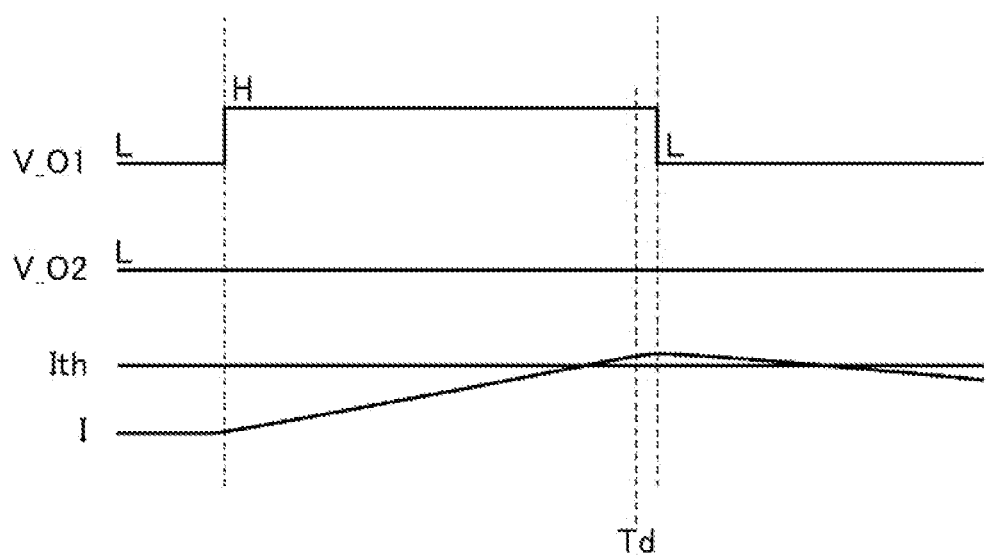
FIG. 7 is a diagram showing a waveform of a current flowing through a drive circuit when polarities match in the first embodiment.
Figure 8:
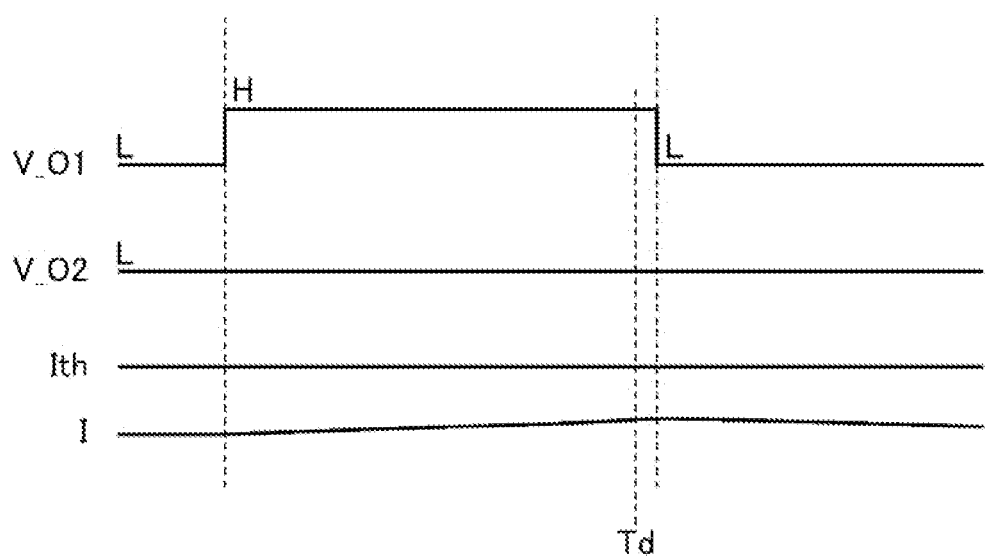
FIG. 8 is a diagram showing a waveform of a current flowing through the drive circuit when polarities do not match in the first embodiment.

FIG. 7 is a diagram showing a waveform of the current I when the polarity of the rotor 133 and the polarity of the polarity detection pulse match and FIG. 8 is a diagram showing a waveform of the current I when the polarity of the rotor 133 and the polarity of the drive pulse do not match. Because the CPU 23 outputs the polarity detection pulse of the first polarity as described above, the decoder 31 controls the transistors 52 to 57 such that the output terminal O1 is connected to the power supply terminal VDD and the output terminal O2 is connected to the power supply terminal VSS, that is, ground.

In FIGS. 7 and 8, V_O1 is a voltage value of the output terminal O1 and V_O2 is a voltage value of the output terminal O2. As shown in FIG. 7, when the polarity detection pulse is output from the CPU 23 and the voltage V_O1 at the output terminal O1 changes from a low level L (VSS) to a high level H (VDD), a current I flows through the coil 130. Here, as shown in FIG. 7, when the polarity of the rotor 133 and the polarity of the polarity detection pulse match, the rotor 133 is repelled, such that an induced current is generated quickly. Therefore, at a current detection timing Td when the current change time has elapsed, the current I exceeds the polarity determination current value Ith and the detection signal DT1 becomes a high level H. On the other hand, as shown in FIG. 8, when the polarities do not match, the rotor 133 is attracted, such that an induced current is generated slowly. Therefore, at the current detection timing Td, the current I becomes less than the polarity determination current value Ith and the detection signal DT1 becomes a low level L.

Thus, the CPU 23 can determine the polarity of the rotor 133 by outputting a polarity detection pulse to apply a voltage to the output terminal O1 and checking, based on the level of the detection signal DT1, whether a current I detected at the predetermined current detection timing Td exceeds the polarity determination current value Ith which is a preset, predetermined value.

After executing the current detection process of step S14, the CPU 23 executes step S15 to stop outputting the polarity detection pulse when the polarity detection time has elapsed from the start of output of the polarity detection pulse.

Next, the CPU 23 executes step S16 to determine whether the detected current value exceeds the polarity determination current value Ith based on the level of the detection signal DT1 at the current detection of step S14.

If the determination of step S16 is YES, the CPU 23 determines in step S17 that the position of the rotor 133, that is, the polarity thereof, matches an IC control polarity, that is, the polarity information stored in the RAM 25, and terminates the polarity detection process. Here, because the polarity detection pulse has the first polarity as described above, the current polarity of the rotor 133 is the first polarity and thus the stepping motor can next be driven by outputting a drive pulse of the first polarity.

On the other hand, if the determination of step S16 is NO, the CPU 23 determines in step S18 that the position of the rotor 133, that is, the polarity thereof, does not match the IC control polarity, that is, the polarity information stored in the RAM 25. Therefore, the CPU 23 executes step S19 to change the polarity information stored in the RAM 25. That is, because the first polarity is stored in the RAM 25 as an initial value of the polarity information, the polarity information in the RAM 25 is changed to the second polarity and the polarity detection process ends.

By performing the above polarity detection process, the polarity information for motor control stored in the RAM 25, that is, the IC control polarity, is matched to the current polarity of the rotor 133 of the stepping motor. Therefore, it is possible to reliably drive the stepping motors by outputting drive pulses from the CPU 23 based on the polarity information stored in the RAM 25.

That is, during normal hand movement, the CPU 23 outputs drive pulses with a given pulse width to the first and second motor control circuits 30A and 30B to move each hand step by step at predetermined time intervals.

The CPU 23 moves the hands by current control driving when fast-moving the hands such as when performing the stopwatch function or when correcting the positions of the hands. In the current control driving for fast-moving each hand, the CPU 23 sets the lower limit target current value Imin and the upper limit target current value Imax respectively in the first reference voltage generation circuit 62 and the second reference voltage generation circuit 63, and after performing control for entering an on state where a drive current is supplied to the coil 130, performs control for switching to an off state where no drive current is supplied when the current value detected by the current detection circuit 60 exceeds the upper target current value Imax and switching to an on state where a drive current is supplied when the current value detected by the current detection circuit 60 falls below the lower target current value Imin. Then, the CPU 23 switches and controls the polarity of the drive current when a preset polarity switching condition such as an on state or an off state period is satisfied.

Operations and Advantages of First Embodiment

The first embodiment as described above can achieve the following advantages.

By outputting a polarity detection pulse after a system reset, it is possible to detect the polarities of the rotors 133 without driving the stepping motors. Therefore, for example, if the battery is inserted and the electronic watch 1 is started after the hands are matched to the reference positions and attached when the electronic watch 1 is assembled, the polarities can be matched without moving the hands and thus a processing time for setting the hands to the reference positions can be shortened compared to when the polarities are matched by moving the hands from the reference positions as in the related art.

In addition, because whether the current value exceeds the polarity determination current value Ith which is a predetermined value is determined at the current detection timing Td, that is, immediately before the output of the polarity detection pulse ends, the pulse width of the polarity detection pulse can be fixed in advance. Therefore, the polarity detection process can be performed in the same time regardless of whether the polarities match or do not match. Further, because the process of detecting and determining the current value is performed only once during the output of the polarity detection pulse, control is simplified and power consumption can be reduced compared to when the process of detecting and determining the current value is performed a plurality of times during the output of the polarity detection pulse.

Because the polarity determination current value Ith, which is a predetermined value in the polarity determination processing, is set lower than the lower limit target current value Imin of the target current value in the drive processing, the pulse width of the polarity detection pulse can be set smaller and power consumption can be reduced compared to when the polarity determination current value Ith is set equal to the lower limit target current value Imin.

Second Embodiment

Figure 9:
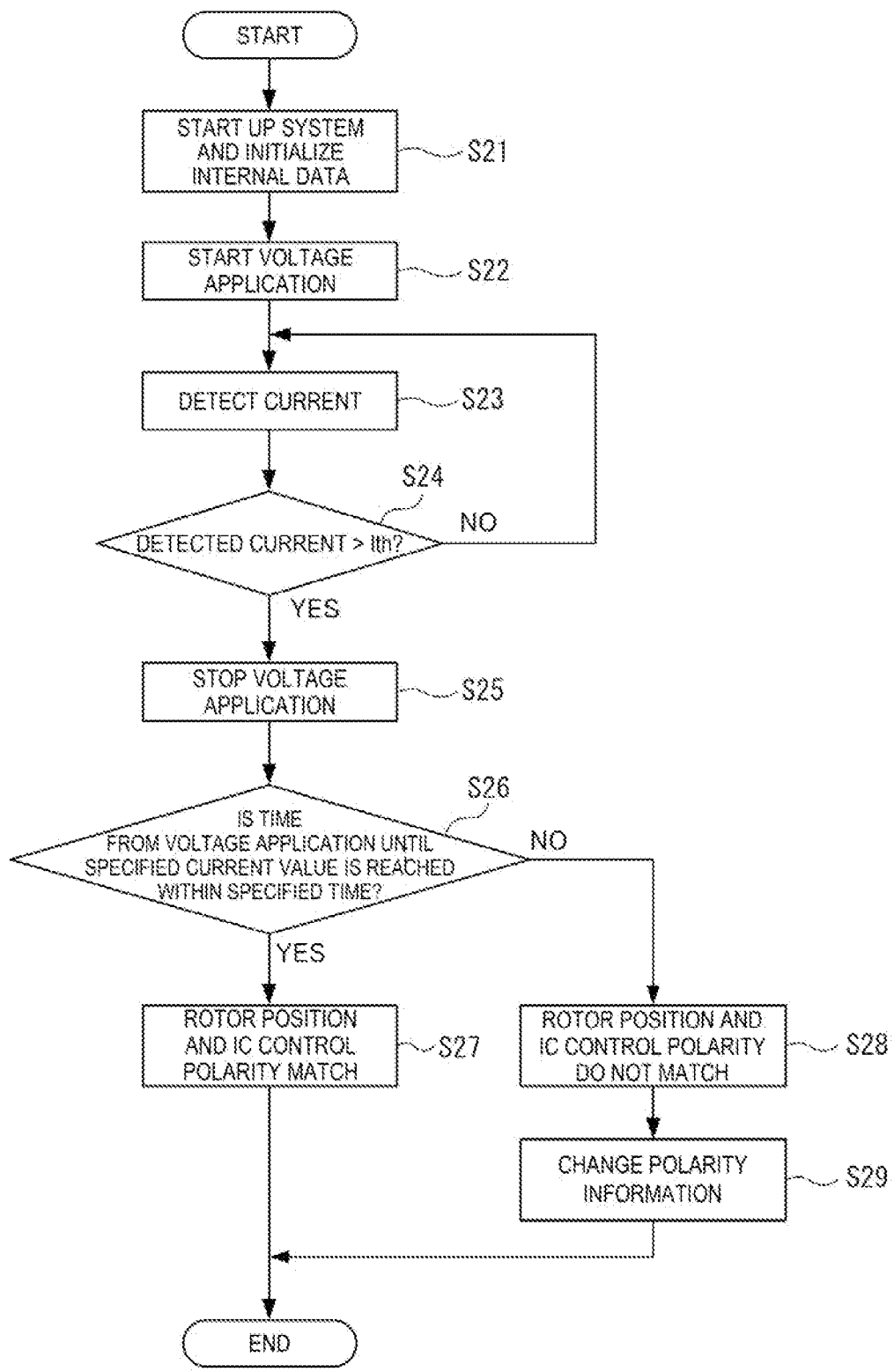
FIG. 9 is a flowchart for explaining a polarity detection process of a second embodiment.

Next, an electronic watch according to a second embodiment will be described. In the second embodiment, the configuration of the electronic watch 1 is similar to that of the first embodiment, but a polarity detection processing method is different from that of the first embodiment. Thus, the polarity detection method of the second embodiment will be described with reference to a flowchart of FIG. 9.

When the system is reset, the CPU 23 executes step S21 to start up the system and initialize internal data such as polarity information stored in the RAM 25. Thus, the information stored in the RAM 25 is the first polarity which is an initial value.

Next, the CPU 23 executes step S22 to output a polarity detection pulse to the driver 50 and start applying a voltage to the coil 130.

Next, the CPU 23 executes step S23 to detect a current flowing through the coil 130. Specifically, the CPU 23 selects a voltage corresponding to the polarity determination current value Ith as the voltage generated by the first reference voltage generation circuit 62 and detects whether the current I flowing through the coil 130 exceeds the polarity determination current value Ith.

After detecting the current in step S23, the CPU 23 executes step S24 to determine whether the detected current I exceeds the polarity determination current value Ith. If the determination of step S24 is NO, the CPU23 executes step S23 and S24 periodically.

On the other hand, if the determination of step S24 is YES, the CPU 23 executes step S25 to stop outputting the polarity detection pulse and stop applying the voltage.

Next, the CPU 23 executes step S26 to determine whether the time from the start of voltage application until the current I flowing through the coil 130 reaches a specified current value, that is, the polarity determination current value Ith, is within a predetermined time.

Figure 10:
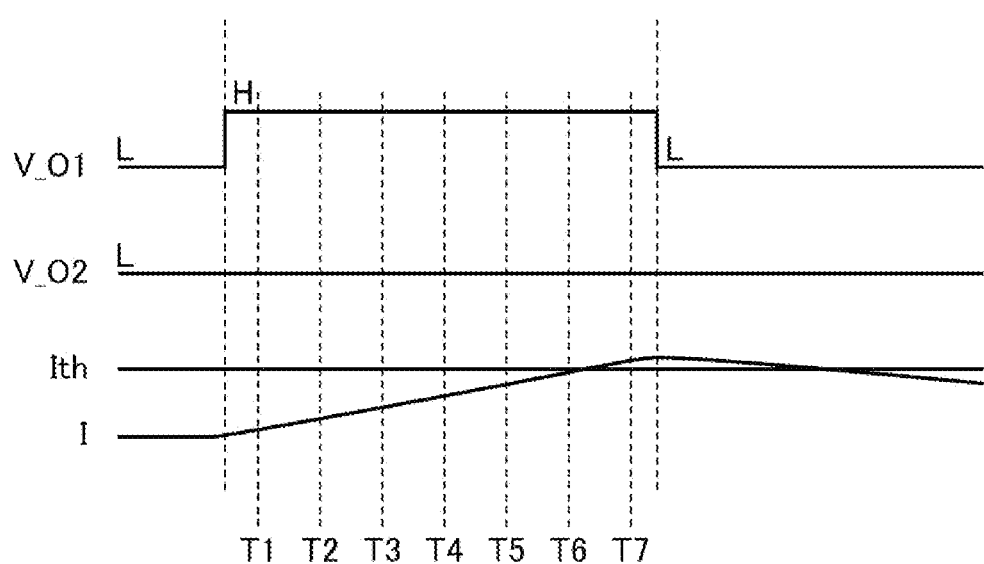
FIG. 10 is a diagram showing a waveform of a current flowing through the drive circuit when polarities match in the second embodiment.
Figure 11:
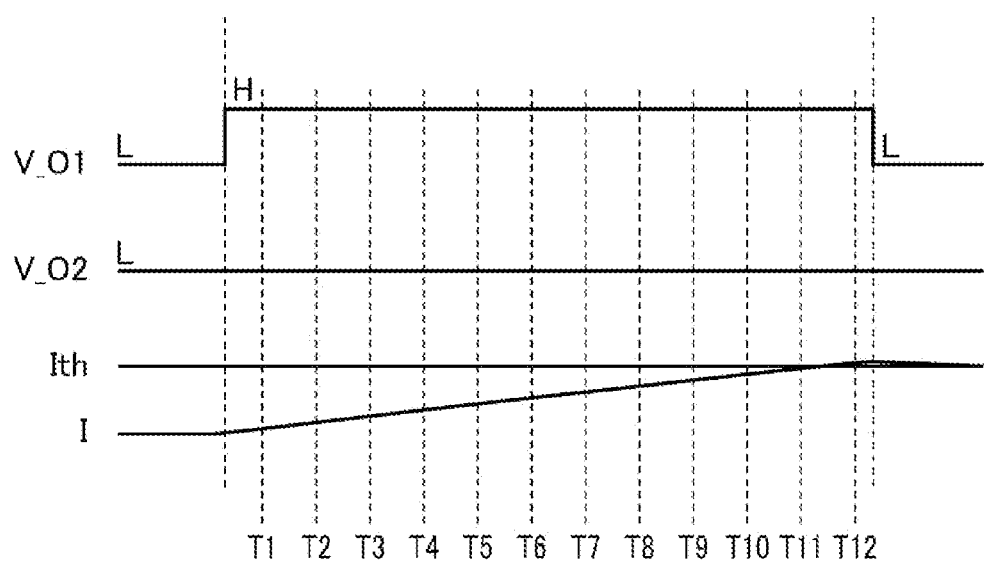
FIG. 11 is a diagram showing a waveform of a current flowing through the drive circuit when polarities do not match in the second embodiment.

FIG. 10 is a diagram showing a waveform of the current I when the polarity of the rotor 133 and the polarity of the polarity detection pulse match and FIG. 11 is a diagram showing a waveform of the current I when the polarity of the rotor 133 and the polarity of the drive pulse do not match.

As shown in FIG. 10, when the polarities match, the rotor 133 is repelled, such that an induced current is generated quickly. On the other hand, as shown in FIG. 11, when the polarities do not match, the rotor 133 is attracted, such that an induced current is generated slowly. Therefore, the CPU 23 performs current detection periodically at T1, T2, . . . and can determine whether the time from voltage application until the specified current value is reached is within the predetermined time by checking whether the number of times current detection has been performed when the detected current I reaches the polarity determination current value Ith is equal to or less than a preset determination value.

In the second embodiment, a period of time during which eight current detections are performed after the start of voltage application is set as the predetermined time and the CPU 23 determines YES in step S26 if the current I reaches the polarity determination current value Ith by T8 which is an eighth current detection timing and determines NO if the current I reaches the polarity determination current value Ith with nine or more current detections. In the case of FIG. 10, the CPU 23 determines YES in step S26 because the current I is equal to or higher than the polarity determination current value Ith at T7 which is a seventh current detection timing. On the other hand, in the case of FIG. 11, the CPU 23 determines NO in step S26 because the current I is equal to or higher than the polarity determination current value Ith at T11 which is an eleventh current detection timing.

If the determination of step S26 is YES, the CPU 23 executes step S27 to determine that the position of the rotor 133, that is, the polarity thereof, matches an IC control polarity, that is, the polarity information stored in the RAM 25, and terminates the polarity detection process, similar to step S17 of the first embodiment.

If the determination of step S26 is NO, the CPU 23 executes step S28 to determine that the position of the rotor 133, that is, the polarity thereof, does not match the IC control polarity, that is, the polarity information stored in the RAM 25, and executes step S29 to change the polarity information stored in the RAM 25, similar to steps S18 and S19 of the first embodiment.

Also in the second embodiment, by performing the above polarity detection process, the polarity information for motor control stored in the RAM 25, that is, the IC control polarity, is matched to the current polarity of the rotor of the stepping motor. Therefore, it is possible to reliably drive the stepping motors by outputting drive pulses from the CPU 23 based on the polarity information stored in the RAM 25. The operation of the hands during normal hand movement and during fast hand movement is similar to that of the first embodiment and thus the description thereof will be omitted.

Operations and Advantages of Second Embodiment

The second embodiment described above can achieve the same operations and advantages as those of the first embodiment.

Further, because the current value is detected at regular intervals while the polarity detection pulse is being output and the current detection process can be terminated when it is detected that the detected current I exceeds the polarity determination current value Ith which is a predetermined value, the polarity can be detected in a short time especially when the polarities match. In addition, because the output of the polarity detection pulse is stopped when it is detected that the current I exceeds the polarity determination current value Ith, the output time of the polarity detection pulse can be shortened and power consumption can be reduced especially when the polarities match.

In the second embodiment, the elapsed time from the start of output of the polarity detection pulse may be measured, and if the elapsed time exceeds a given time while the detected current value does not exceed the polarity determination current value Ith, the output of the polarity detection pulse may be stopped and it may be determined that the polarity of the rotor 133 does not match the polarity information stored in the RAM 25. For example, if the determination of step S24 is NO and the number of current detections indicating the elapsed time from the start of output of the polarity detection pulse reaches a predetermined number, for example, 20, it may be determined that the polarity detection process has timed out and steps S28 and S29 may be executed.

Adding such a time-out determination ensures that, even if the detected current I does not exceed the polarity determination current value Ith, the output of the polarity detection pulse is stopped when a given time has elapsed, such that it is possible to prevent an increase in power consumption due to a continued output of the polarity detection pulse.

Third Embodiment

Next, an electronic watch according to a third embodiment will be described.

The electronic watch of the third embodiment differs from that of the first embodiment in the specifications of the IC 20. That is, in the IC 20 of the third embodiment, it is not possible to directly change the polarity of a drive pulse managed in the IC 20, that is, the polarity information stored in the RAM 25, but a drive pulse is output to change the polarity information.

A polarity detection method according to the third embodiment for the electronic watch using an IC 20 having such specifications will be described with reference to a flowchart of FIG. 12.

Figure 12:
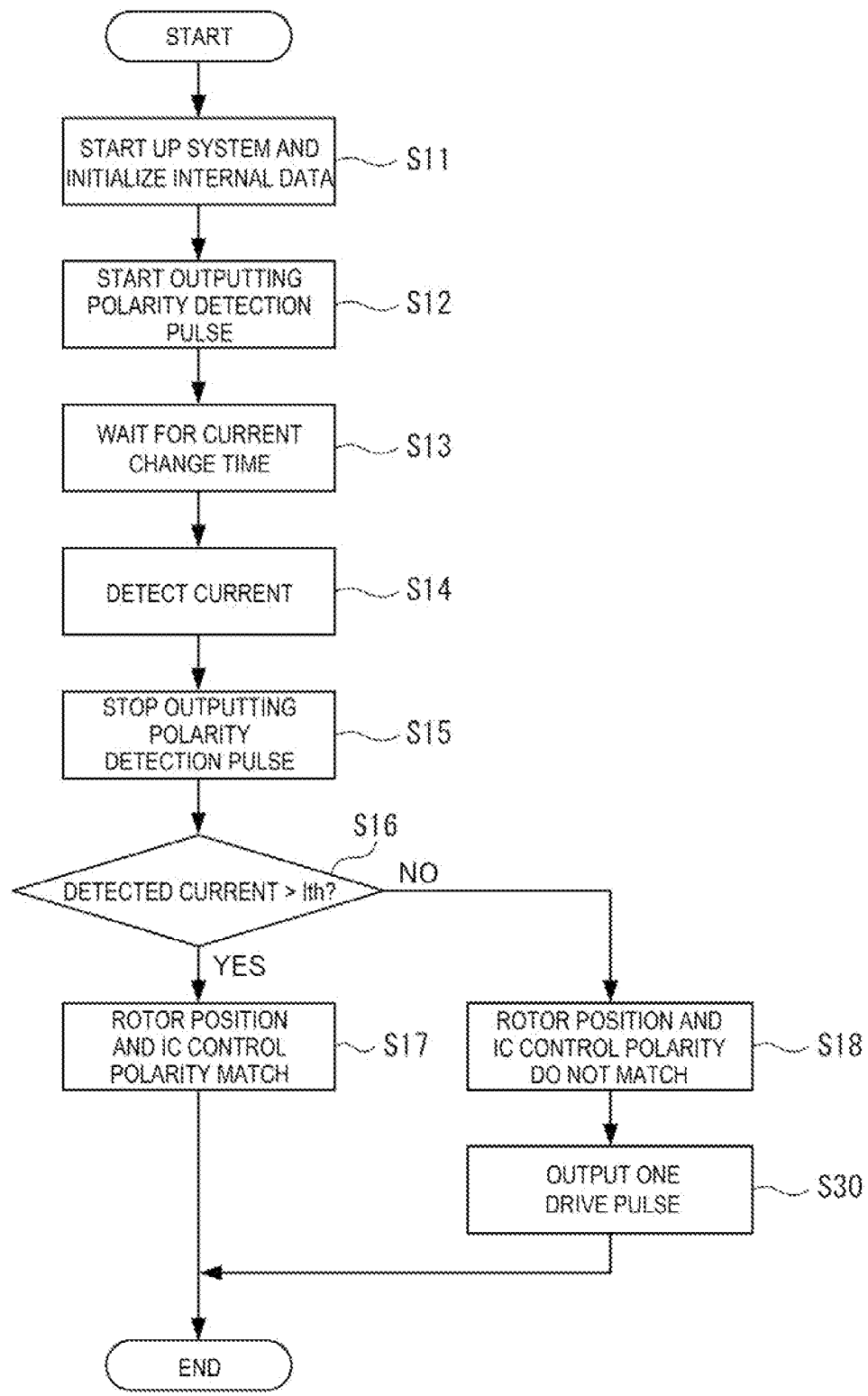
FIG. 12 is a flowchart for explaining a polarity detection process of a third embodiment.

As shown in FIG. 12, steps S11 to S18 in the third embodiment are the same processing steps as those of the first embodiment and thus the description thereof will be omitted. After the processing of step S18, the CPU 23 executes step S30 to output one drive pulse. This drive pulse is a fixed pulse with a preset pulse width, which is a pulse that can drive the stepping motor one step when the polarity of the rotor 133 and the polarity information in the RAM 25 match.

In step S30, although one drive pulse is output, the rotor 133 does not rotate and the polarity information stored in the RAM 25 is changed because the rotor position and the IC control polarity do not match. Thus, the polarity information in the RAM 25 can be changed to match the polarity of the rotor 133.

After the polarity detection process shown in FIG. 12 ends, the polarity of the rotor 133 and the polarity information stored in the RAM 25 match, and thus in subsequent motor driving, a drive pulse with a matching polarity can be output and the stepping motor can be reliably driven.

Figure 13:
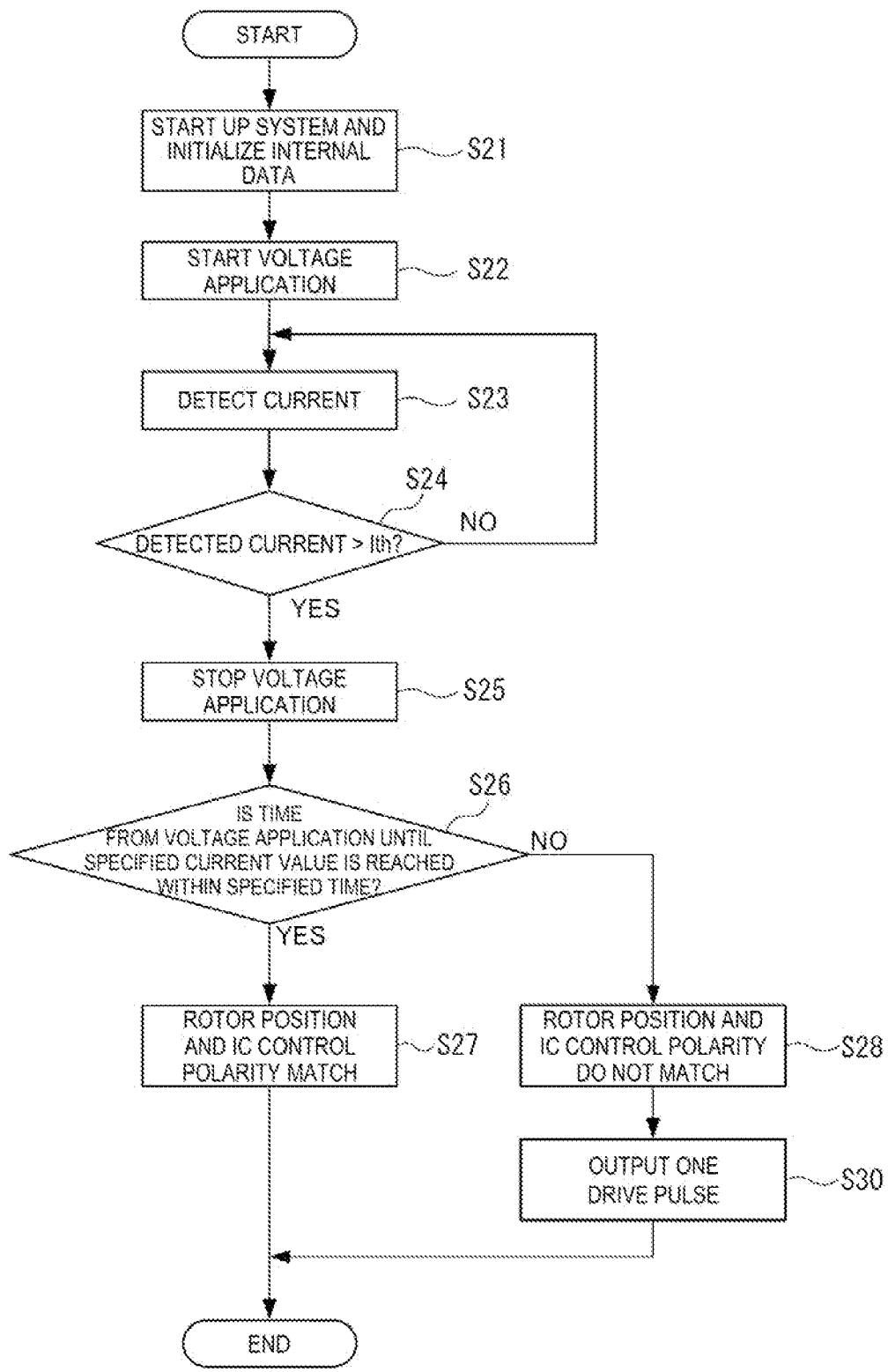
FIG. 13 is a flowchart illustrating another example of a polarity detection process of the third embodiment.

In the third embodiment, the same polarity determination method as in the second embodiment may be adopted. A polarity detection process in this case is shown as a flowchart in FIG. 13. As shown in FIG. 13, steps S21 to S28 are the same processing steps as those of the second embodiment and thus the description thereof will be omitted. After the processing of step S28, the CPU 23 executes step S30 to output one drive pulse to change the polarity information in the RAM 25, such that the polarity information can be matched to the polarity of the rotor 133. Further, a time-out determination may also be added in the process of FIG. 13.

Operations and Advantages of Third Embodiment

According to the third embodiment, even in the electronic watch using an IC 20 whose polarity information cannot be directly changed, the polarity information in the RAM 25 can be matched to the polarity of the rotor 133 without rotating the rotor 133 by detecting the polarity of the rotor 133, and only when the polarity of the rotor 133 does not match the polarity information in the RAM 25, outputting a drive pulse to change the polarity information.

Fourth Embodiment

An electronic watch 1B of the fourth embodiment and a polarity detection process for the same will be described with reference to FIGS. 14 and 15.

Figure 14:
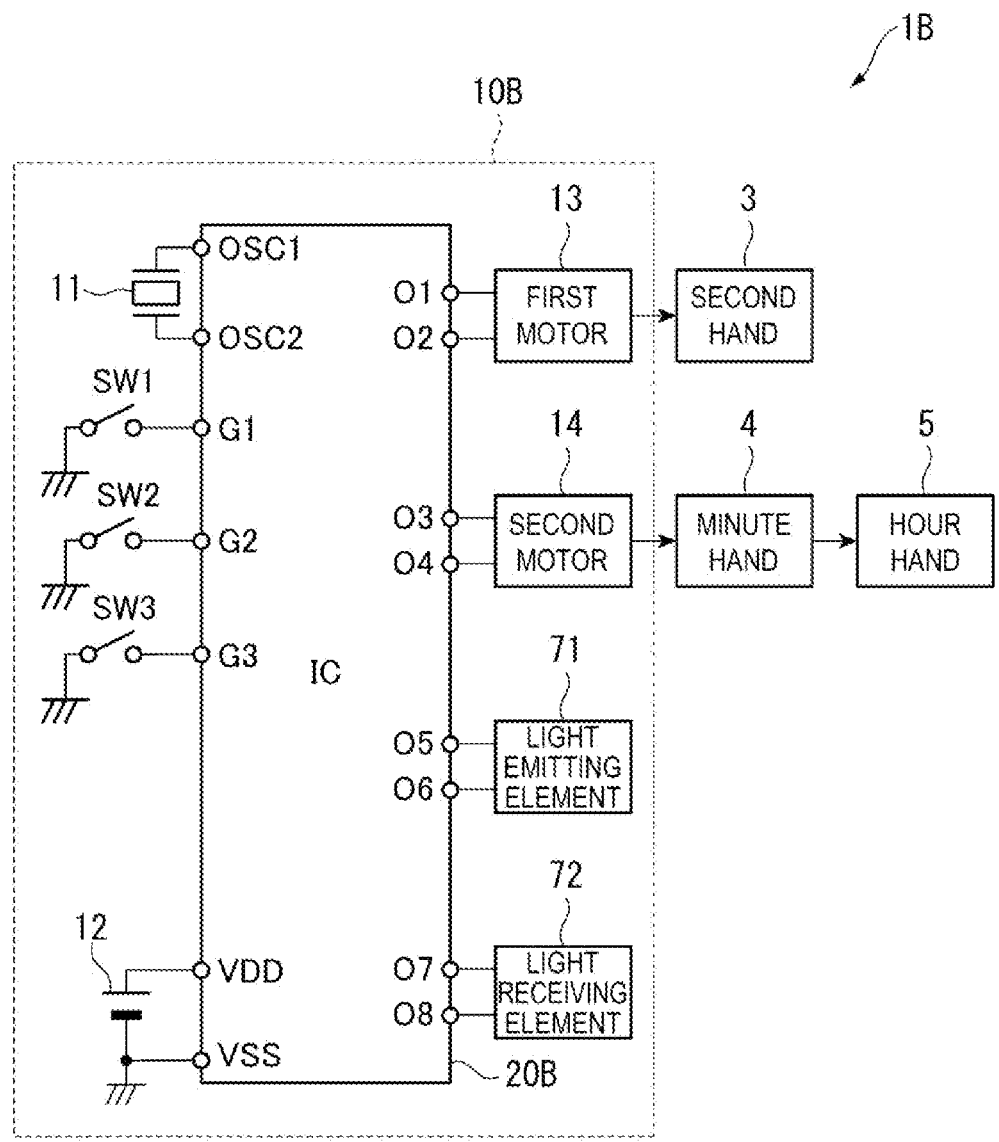
FIG. 14 is a circuit diagram showing a circuit configuration of an electronic watch of a fourth embodiment.
Figure 15:
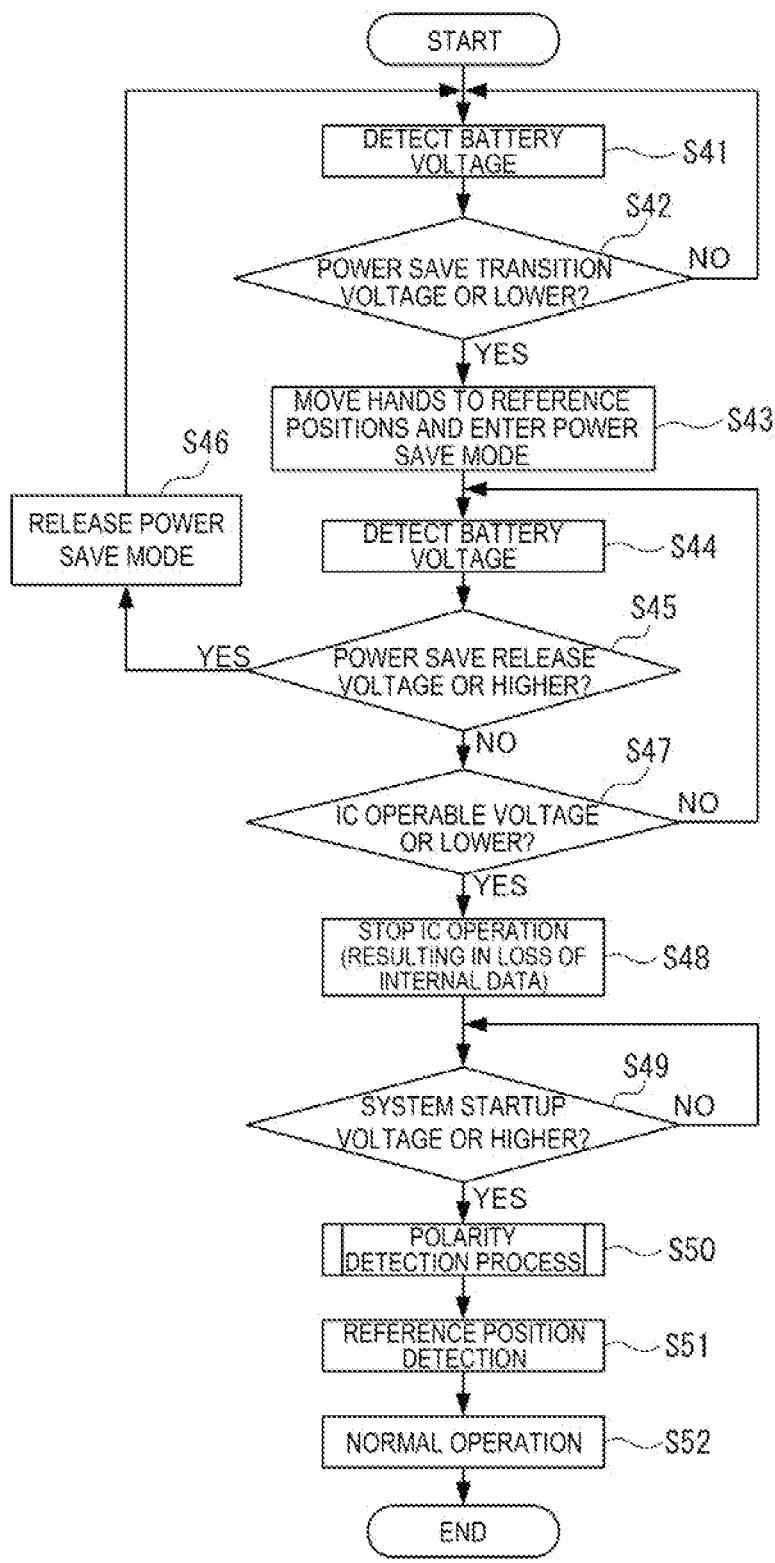
FIG. 15 is a flowchart for explaining a control process of the fourth embodiment.

As shown in FIG. 14, the electronic watch 1B is obtained by adding a hand position detection mechanism to the electronic watch 1 of the first embodiment. That is, a movement 10B of the electronic watch 1B includes a light emitting element 71 and a light receiving element 72 as a hand position detection mechanism for detecting that each hand is at a reference position. Specifically, the movement 10B of the electronic watch 1B includes a light emitting element 71 and a light receiving element 72 arranged to sandwich a train wheel that drives the second hand 3 therebetween and a light emitting element 71 and a light receiving element 72 arranged to sandwich a train wheel that drives the minute and hour hands 4 and 5 therebetween. An IC 20B of the electronic watch 1B has the same configuration as the IC 20 of the first embodiment, except that it has terminals O5 to O8 to which the light emitting elements 71 and the light receiving elements 72 are connected, and thus the description thereof will be omitted.

A detection hole arranged between the light emitting element 71 and the light receiving element 72 when the second hand 3 is at a position of 0 seconds which is its reference position is formed in the train wheel that drives the second hand 3, such that the light receiving element 72 receives detection light output from the light emitting element 71 when the second hand 3 is at the reference position. This can detect that the second hand 3 is at the reference position. Similarly, when the minute and hour hands 4 and 5 are at a position of 0 hours and 0 minutes which is their reference position, the light receiving element 72 detects detection light from the light emitting element 71 and thus can detect that the minute and hour hands 4 and 5 are at the reference position.

The electronic watch 1B also includes a power generator such as a solar panel and the battery 12 is made of a secondary battery that can be charged with power generated by the power generator.

Next, a control process for the electronic watch 1B will be described with reference to a flowchart of FIG. 15.

The CPU 23 of the IC 20B executes step S41 to detect a battery voltage at regular intervals while the hands are moving such as during a normal operation in which the hands indicate the time or during a stopwatch operation.

Next, the CPU 23 executes step S42 to determine whether the voltage detected in step S41 has dropped to a preset power save transition voltage or lower. The CPU 23 repeats and executes step S41 and S42 if the determination of step S42 is NO.

If the determination of step S42 is YES, the CPU 23 executes step S43 to move the hands to the reference positions and enter a power save mode. In the power save mode, the CPU 23 continues to measure the time, but the first and second motors 13 and 14 are not driven and thus the hand movement remains stopped. Therefore, the second, minute, and hour hands 3, 4, and 5 are stopped at the reference positions.

After entering the power save mode in step S43, the CPU 23 executes step S44 to detect the battery voltage at regular intervals.

Next, the CPU 23 executes step S45 to determine whether the voltage detected in step S44 has returned to a preset power save release voltage or higher. The power save release voltage is a voltage higher than the power save transition voltage and the CPU 23 determines YES in step S45 when the battery 12 is charged by the power generator and the battery voltage rises.

If the determination of step S45 is YES, the CPU 23 executes step S46 to release the power save mode. When the power save mode has been released, the CPU 23 moves the second, minute, and hour hands 3, 4, and 5 to positions indicating the measured time through fast movement and returns to the normal operation and then returns to step S41 to continue the control.

On the other hand, if the determination of step S45 is NO, the CPU 23 executes step S47 to determine whether the voltage detected in step S44 has dropped to an IC operable voltage or lower. The IC operable voltage is a voltage lower than the power save transition voltage.

If the determination of S47 is NO, the CPU 23 returns to step S44 to continue the control.

On the other hand, if the determination of step S47 is YES, the CPU 23 executes step S48 to stop the operation of the IC 20B. Thereby, the internal data such as the polarity information stored in the RAM 25 is lost.

After that, if the battery voltage is less than a preset system startup voltage in step S49, that is, if the determination of step S49 is NO, the IC operation stop state is continued. The system startup voltage is a voltage value higher than the IC operable voltage and is preferably set to a voltage value higher than the power save transition voltage such that the power save mode is not entered immediately after the system starts up.

When the battery 12 is charged by the power generator and the battery voltage becomes equal to or higher than the system startup voltage, such that the determination of step S49 is YES, the CPU 23 performs a polarity detection process in step S50. The polarity detection process is the same as that of any one of the first to third embodiments and thus the description thereof will be omitted. That is, when the polarity information in the RAM 25 can be directly changed according to the specifications of the IC 20, the CPU 23 performs the same polarity detection process as that of FIG. 6 or 9. On the other hand, when it is necessary to output a drive pulse to change the polarity information in the RAM 25 according to the specifications of the IC 20, the CPU 23 performs the same polarity detection process as that of FIG. 12 or 13.

After performing the polarity detection process in step S50, the CPU 23 executes step S51 to perform a reference position detection process using the light emitting elements 71 and the light receiving elements 72. Here, because the rotors 133 do not rotate in the polarity detection process of step S50, the positions of the hands remain at the reference positions to which they have moved in step S43. Therefore, in step S51, it can be detected that the hands are positioned at the reference positions by a first reference position detection operation.

After detecting the reference positions in step S51, the CPU 23 executes step S52 to start a normal operation. When the normal operation starts, the hands also start to move, but because the operation of the IC 20 has stopped and the internal data has also been lost, there is a high possibility that the time indicated by the hands will be different from the current time. In this case, the user performs an operation of setting the time of the hands. For example, when the electronic watch 1B has a function of receiving standard radio waves or satellite signals to set the time, the user performs a forced reception operation. On the other hand, when the electronic watch 1B is designed to set the time through a manual operation of the crown 6, the A-button 7, and the B-button 8, the user manually moves the hands to set the time.

Advantages of Fourth Embodiment

According to the electronic watch 1B of the fourth embodiment, when the system starts up after the operation of the IC 20B stops and the polarity information is also lost, the polarity detection process in step S50 is performed and thus the polarity of the rotor 133 can be detected without moving the rotors 133. Therefore, the polarity detection process can be performed without moving the hands that have moved to the reference positions when the power save mode has been entered and thereafter the reference position detection process of step S51 can be performed with the hands being positioned at the reference positions and thus the reference position detection process can be completed in a short period of time, the need to move the hands for setting them to the reference positions can be eliminated, and power consumption can be reduced.

In addition, if the remaining charge of the battery 12 which is a secondary battery, that is, the battery voltage, falls below the power save mode transition voltage which is a predetermined threshold, the hands are moved to the reference positions and the driving is stopped and thus a voltage drop of the battery 12 can be prevented.

Other Embodiments

The present disclosure is not limited to the above embodiments and various modifications can be made without departing from the spirit of the present disclosure.

For example, the polarity determination current values Ith in the above embodiments are the same value, but the polarity determination current values Ith in the first and third embodiments may be different values from the polarity determination current values Ith in the second and fourth embodiments.

The storage unit that stores the polarity information is not limited to the RAM 25 and may be an internal storage unit provided in the CPU 23.

When the power save mode is entered, the second, minute, and hour hands 3, 4, and 5 are moved to the reference positions in the fourth embodiment, but the minute and hour hands 4 and 5 may be moved to the reference positions and the second hand 3 may be moved to a mode position indicating that the power save mode has been entered, for example, a 45-second position, and then stopped.

When the electronic watch 1B is provided with a date indicator, the date indicator may be moved to a reference position and stopped. Many wristwatches do not have a hand position detection mechanism for the date indicator and it is necessary to manually move the date indicator to the reference position when setting the reference position of the date indicator. Thus, if the date indicator is moved to the reference position in advance in the power save mode, the need to move the date indicator when setting the reference position is eliminated, the reference position setting process can be performed in a short time, and power consumption can be reduced.

Also, the polarity detection process is not limited to that which is performed when the RAM 25 is initialized and may be performed at regular intervals during hand movement, and for example, in the case of an electronic watch including a built-in acceleration sensor or the like, the polarity detection process may be performed when it is detected that the electronic watch has fallen, that is, when there is a possibility that the rotor 133 has rotated and the polarity thereof has changed.

Supplementary Description of Present Disclosure

An electronic watch of the present disclosure includes a hand, a stepping motor including a coil, the stepping motor being configured to drive the hand, a drive circuit configured to drive the stepping motor, a controller configured to control the drive circuit, a current detection circuit configured to detect a current value flowing through the drive circuit, and a storage unit configured to store polarity information of a drive pulse output from the controller to the drive circuit, wherein the controller is configured to: initialize the polarity information stored in the storage unit when the storage unit is initialized, output a polarity detection pulse to the drive circuit based on the initialized polarity information, the polarity detection pulse not causing the stepping motor to rotate by one step, perform a polarity determination processing of determining whether a polarity of the stepping motor and the polarity information match based on the current value detected by the current detection circuit in response to the output of the polarity detection pulse, and change the polarity information when the polarity of the stepping motor and the polarity information do not match.

According to the electronic watch of the present disclosure, a polarity detection pulse that does not cause the stepping motor to rotate by one step, that is, a pulse having a narrower pulse width than a drive pulse, is output based on initialized polarity information and thus it is possible to determine whether the polarity of the stepping motor matches the initialized polarity information without driving the stepping motor, and if they do not match, it is possible to change the polarity information. That is, because the polarities can be matched while maintaining the position of the hand at the time of initialization, there is no need to move the hand by outputting drive pulses in the forward and reverse directions as in the related art when setting the reference position and it is possible to shorten the processing time for setting the hand to the reference position.

In the electronic watch of the present disclosure, preferably, the controller is configured to determine whether the current value exceeds a predetermined value based on the output of the polarity detection pulse and determine that the polarity of the stepping motor and the polarity information match when the current value exceeds the predetermined value.

According to the electronic watch of the present disclosure, the pulse width of the polarity detection pulse can be fixed in advance because whether the current value exceeds the predetermined value is determined immediately before the output of the polarity detection pulse ends. Therefore, the polarity detection process can be performed in the same time regardless of whether the polarities match or do not match. Further, because the process of detecting and determining the current value is performed only once during the output of the polarity detection pulse, power consumption can be reduced compared to when the process of detecting and determining the current value is performed a plurality of times during the output of the polarity detection pulse.

In the electronic watch of the present disclosure, preferably, the current detection circuit is configured to detect the current value during output of the polarity detection pulse, and the controller is configured to measure an elapsed time from start of output of the polarity detection pulse and determine that the polarity of the stepping motor and the polarity information match when the elapsed time until it is detected that the current value exceeds the predetermined value is within a predetermined time.

According to the electronic watch of the present disclosure, the current value is detected while the polarity detection pulse is being output and the polarity is determined using the elapsed time until it is detected that the current value exceeds the predetermined value and thus the processing can be completed in a short time especially when the polarities match.

In the electronic watch of the present disclosure, preferably, the controller is configured to stop outputting the polarity detection pulse upon detecting that the current value exceeds the predetermined value.

According to the electronic watch of the present disclosure, the output of the polarity detection pulse can be stopped when it is detected that the current value exceeds the predetermined value and thus the output time of the polarity detection pulse can also be shortened and power consumption can be reduced especially when the polarities match.

In the electronic watch of the present disclosure, preferably, the controller is configured to measure the elapsed time from the start of output of the polarity detection pulse, and when the elapsed time exceeds a predetermined time while the current value does not exceed the predetermined value, stop outputting the polarity detection pulse and determine that the polarity and the polarity information do not match.

According to the electronic watch of the present disclosure, even if the detected current does not exceed the predetermined value, the output of the polarity detection pulse is stopped when a given time has elapsed and thus it is possible to prevent an increase in power consumption due to a continued output of the polarity detection pulse.

In the electronic watch of the present disclosure, preferably, the drive circuit is controlled to be in an on state where the drive circuit supplies a drive current to the coil or an off state where the drive circuit does not supply the drive current, the controller is configured to, in drive processing for the hand, compare the current value detected by the current detection circuit with a target current value and control the drive circuit to be in the on state or the off state according to a result of the comparison, and the predetermined value in the polarity determination processing is lower than the target current value in the drive processing.

According to the electronic watch of the present disclosure, the predetermined value in the polarity determination processing is set lower than the target current value in the drive processing and thus the pulse width of the polarity detection pulse can be set smaller and power consumption can be reduced compared to when the predetermined value is set equal to the target current value.

In the electronic watch of the present disclosure, preferably, the controller is configured to, upon determining that the polarity of the stepping motor and the polarity information do not match, output a drive pulse, which drives the stepping motor by one step when the polarity of the stepping motor and the polarity information match based on the initialized polarity information, to the drive circuit to change the polarity information.

According to the electronic watch of the present disclosure, when it is determined that the polarity of the stepping motor and the polarity information do not match, a drive pulse with a non-matching polarity is output and thus only the polarity information stored in the storage unit can be changed without deriving the stepping motor. Therefore, the present disclosure can be applied to an electronic watch in which the polarity information cannot be directly changed due to the specifications of the IC.

In the electronic watch of the present disclosure preferably further includes a secondary battery, and a power generator configured to charge the secondary battery, wherein the controller is configured to move at least one hand to a reference position and stop driving the moved hand when a remaining charge of the secondary battery falls below a predetermined threshold.

According to the electronic watch of the present disclosure, if the remaining charge of the secondary battery charged by a power generator such as a solar panel, that is, the battery voltage, falls below the predetermined threshold, the hand is moved to the reference position and the driving is stopped and thus a voltage drop of the secondary battery can be prevented. In addition, the reference position of the hand can be set without moving the hand if the hand is at the reference position when the system has started up because the voltage of the secondary battery has risen due to charging by the power generator after the storage unit is initialized due to a further drop in the battery voltage.

In the electronic watch of the present disclosure preferably further includes a hand position detection mechanism configured to detect that the at least one hand is at the reference position, wherein the controller is configured to, when the storage unit has been initialized, perform hand position detection processing using the hand position detection mechanism after the polarity determination processing.

According to the electronic watch of the present disclosure, when the polarity determination processing is performed with the hand being at the reference position, the hand does not move from the reference position, and thus when the polarity determination processing is performed using the hand position detection mechanism, the hand can be detected in the shortest possible time, such that the processing time for hand position detection can be minimized and power consumption can be reduced accordingly.

An electronic watch of the present disclosure includes a hand, a stepping motor including a coil, the stepping motor being configured to drive the hand, a drive circuit configured to drive the stepping motor, a controller configured to control the drive circuit, a current detection circuit configured to detect a current value flowing through the drive circuit, and a storage unit configured to store polarity information of a drive pulse output from the controller to the drive circuit, wherein the controller is configured to: output a polarity detection pulse to the drive circuit based on the polarity information stored in the storage unit, the polarity detection pulse not causing the stepping motor to rotate by one step, the current detection circuit is configured to detect the current value during output of the polarity detection pulse, and the controller is configured to measure an elapsed time from start of output of the polarity detection pulse, determine that a polarity of the stepping motor and the polarity information match when the elapsed time until it is detected that the current value exceeds a predetermined value is within a predetermined time, determine that the polarity of the stepping motor and the polarity information do not match when the elapsed time exceeds the predetermined time, and change the polarity information when the polarity of the stepping motor and the polarity information do not match.

According to the electronic watch of the present disclosure, a pulse having a narrower pulse width than a polarity detection pulse, that is, a drive pulse, which does not cause the stepping motor to rotate by one step is output based on the polarity information stored in the storage unit and thus it is possible to determine whether the polarity of the stepping motor matches the stored polarity information without driving the stepping motor, and if they do not match, it is possible to change the polarity information. That is, because the polarities can be matched while maintaining the position of the hand, there is no need to move the hand by outputting drive pulses in the forward and reverse directions as in the related art when setting the reference position and it is possible to shorten the processing time for setting the reference position.

Further, the current value is detected while the polarity detection pulse is being output and the polarity is determined using the elapsed time until it is detected that the current value exceeds the predetermined value and thus the processing can be completed in a short time especially when the polarities match.

An electronic watch control method of the present disclosure is a method for controlling an electronic watch including a hand, a stepping motor including a coil, the stepping motor being configured to drive the hand, a drive circuit configured to drive the stepping motor, a current detection circuit configured to detect a current value flowing through the drive circuit, and a storage unit configured to store polarity information of a drive pulse output to the drive circuit, the method including initializing the polarity information stored in the storage unit when the storage unit is initialized, outputting a polarity detection pulse to the drive circuit based on the initialized polarity information, the polarity detection pulse not causing the stepping motor to rotate by one step, performing a polarity determination processing of determining whether a polarity of the stepping motor and the polarity information match based on the current value detected by the current detection circuit in response to the output of the polarity detection pulse, and changing the polarity information when the polarity of the stepping motor and the polarity information do not match.

According to the electronic watch control method of the present disclosure, a pulse having a narrower pulse width than a polarity detection pulse, that is, a drive pulse, which does not cause the stepping motor to rotate by one step is output based on initialized polarity information and thus it is possible to determine whether the polarity of the stepping motor matches the initialized polarity information without driving the stepping motor, and if they do not match, it is possible to change the polarity information. That is, because the polarities can be matched while maintaining the position of the hand at the time of initialization, there is no need to move the hand by outputting drive pulses in the forward and reverse directions as in the related art when setting the reference position and it is possible to shorten the processing time for setting the reference position.

An electronic watch control method of the present disclosure is a method for controlling an electronic watch including a hand, a stepping motor including a coil, the stepping motor being configured to drive the hand, a drive circuit configured to drive the stepping motor, a current detection circuit configured to detect a current value flowing through the drive circuit, and a storage unit configured to store polarity information of a drive pulse output to the drive circuit, the method including outputting a polarity detection pulse to the drive circuit based on the polarity information stored in the storage unit, the polarity detection pulse not causing the stepping motor to rotate by one step, detecting the current value during output of the polarity detection pulse by the current detection circuit, measuring an elapsed time from start of output of the polarity detection pulse, determining that a polarity of the stepping motor and the polarity information match when the elapsed time until it is detected that the current value exceeds a predetermined value is within a predetermined time, determining that the polarity of the stepping motor and the polarity information do not match when the elapsed time exceeds the predetermined time, and changing the polarity information when the polarity of the stepping motor and the polarity information do not match.

According to the electronic watch control method of the present disclosure, a pulse having a narrower pulse width than a polarity detection pulse, that is, a drive pulse, which does not cause the stepping motor to rotate by one step is output based on the polarity information stored in the storage unit and thus it is possible to determine whether the polarity of the stepping motor matches the stored polarity information without driving the stepping motor, and if they do not match, it is possible to change the polarity information. That is, because the polarities can be matched while maintaining the position of the hand, there is no need to move the hand by outputting drive pulses in the forward and reverse directions as in the related art when setting the reference position and it is possible to shorten the processing time for setting the reference position. Further, the current value is detected while the polarity detection pulse is being output and the polarity is determined using the elapsed time until it is detected that the current value exceeds the predetermined value and thus the processing can be completed in a short time especially when the polarities match.

What is claimed is:

1. An electronic watch comprising:
   a hand;
   a stepping motor including a coil, the stepping motor being configured to drive the hand;
   a drive circuit configured to drive the stepping motor;

a controller configured to provide a drive pulse to the drive circuit to control the drive circuit;
a current detection circuit configured to detect a current value flowing through the drive circuit; and
a random access memory configured to store polarity information of the drive pulse,
wherein the controller is configured to:
   delete the polarity information stored in the random access memory when the electronic watch is initialized;
   store initialized polarity information into the random access memory after the polarity information stored in the random access memory has been deleted;
   output a polarity detection pulse to the drive circuit based on the initialized polarity information stored in the random access memory, the polarity detection pulse not causing the stepping motor to rotate by one step;
   perform a polarity determination processing of determining whether a polarity of the stepping motor and the initialized polarity information match based on the current value detected by the current detection circuit in response to the output of the polarity detection pulse; and
   change the initialized polarity information when the polarity of the stepping motor and the initialized polarity information do not match.

2. The electronic watch according to claim 1, wherein
The controller is further configured to determine whether the current value exceeds a predetermined value based on the output of the polarity detection pulse and determine that the polarity of the stepping motor and the initialized polarity information match when the current value exceeds the predetermined value.

3. The electronic watch according to claim 1, wherein
the current detection circuit is further configured to detect the current value during output of the polarity detection pulse, and
the controller is further configured to measure an elapsed time from start of output of the polarity detection pulse and determine that the polarity of the stepping motor and the initialized polarity information match when the elapsed time until it is detected that the current value exceeds a predetermined value is within a predetermined time.

4. The electronic watch according to claim 3, wherein
the controller is further configured to stop outputting the polarity detection pulse upon detecting that the current value exceeds the predetermined value.

5. The electronic watch according to claim 3, wherein
the controller is further configured to measure the elapsed time from the start of output of the polarity detection pulse, and
when the elapsed time exceeds the predetermined time while the current value does not exceed the predetermined value, the controller is further configured to stop outputting the polarity detection pulse and determine that the polarity of the stepping motor and the initialized polarity information do not match.

6. The electronic watch according to claim 1, wherein
the drive circuit is further controlled to be in an on state where the drive circuit supplies a drive current to the coil or an off state where the drive circuit does not supply the drive current,
the controller is further configured to, in drive processing for the hand, compare the current value detected by the current detection circuit with a target current value and control the drive circuit to be in the on state or the off state according to a result of the comparison, and
a predetermined value of the current value detected by the current detection circuit in the polarity determination processing is lower than the target current value in the drive processing.

7. The electronic watch according to claim 1, wherein,
when the controller determines that the polarity of the stepping motor and the initialized polarity information do not match, the controller is further configured to output the drive pulse to cause the drive circuit to drive the stepping motor by one step so as to change the initialized polarity information of the drive pulse.

8. The electronic watch according to claim 1, further comprising:
a secondary battery; and
a power generator configured to charge the secondary battery,
wherein the controller is further configured to move the hand to a reference position and stop the movement of the hand when a remaining charge of the secondary battery falls below a predetermined threshold.

9. The electronic watch according to claim 8, further comprising a hand position detection mechanism configured to detect that the hand is at the reference position,
wherein the controller is further configured to, when the electronic watch is initialized, perform hand position detection processing using the hand position detection mechanism after the polarity determination processing.

10. The electronic watch according to claim 1, wherein,
when the controller determines that the polarity of the stepping motor and the initialized polarity information do not match, the controller is further configured to output the drive pulse to cause the drive circuit to drive the stepping motor by one step so as to change the initialized polarity information of the drive pulse.

11. A method of controlling an electronic watch including a hand, a stepping motor including a coil, the stepping motor being configured to drive the hand, a drive circuit configured to drive the stepping motor, a current detection circuit configured to detect a current value flowing through the drive circuit, and a random access memory configured to store polarity information of a drive pulse output to the drive circuit, the method for causing a controller to execute a process, the method comprising executing on the controller the steps of:
   deleting the polarity information stored in the random access memory when the electronic watch is initialized;
   storing initialized polarity information into the random access memory after the polarity information stored in the random access memory has been deleted;
   outputting a polarity detection pulse to the drive circuit based on the initialized polarity information stored in the random access memory, the polarity detection pulse not causing the stepping motor to rotate by one step;
   performing a polarity determination processing of determining whether a polarity of the stepping motor and the initialized polarity information match based on the current value detected by the current detection circuit in response to the output of the polarity detection pulse; and
   changing the initialized polarity information when the polarity of the stepping motor and the initialized polarity information do not match.

12. The method according to claim 11, wherein
the controller is further configured to determine whether the current value exceeds a predetermined value based on the output of the polarity detection pulse and determine that the polarity of the stepping motor and the initialized polarity information match when the current value exceeds the predetermined value.

13. The method according to claim 11, wherein
the current detection circuit is further configured to detect the current value during output of the polarity detection pulse, and
the controller is further configured to measure an elapsed time from start of output of the polarity detection pulse and determine that the polarity of the stepping motor and the initialized polarity information match when the elapsed time until it is detected that the current value exceeds a predetermined value is within a predetermined time.

14. The method according to claim 13, wherein
the controller is further configured to stop outputting the polarity detection pulse upon detecting that the current value exceeds the predetermined value.

15. The method according to claim 13, wherein
the controller is further configured to measure the elapsed time from the start of output of the polarity detection pulse, and when the elapsed time exceeds the predetermined time while the current value does not exceed the predetermined value, the controller is further configured to stop outputting the polarity detection pulse and determine that the polarity of the stepping motor and the initialized polarity information do not match.

16. The method according to claim 11, wherein
the drive circuit is further controlled to be in an on state where the drive circuit supplies a drive current to the coil or an off state where the drive circuit does not supply the drive current,
the controller is further configured to, in drive processing for the hand, compare the current value detected by the current detection circuit with a target current value and control the drive circuit to be in the on state or the off state according to a result of the comparison, and
a predetermined value of the current value detected by the current detection circuit in the polarity determination processing is lower than the target current value in the drive processing.

* * * * *